United States Patent
Okabayashi et al.

(10) Patent No.: US 10,168,983 B2
(45) Date of Patent: Jan. 1, 2019

(54) SERVER APPARATUS, CONTENT DISPLAY CONTROL SYSTEM, AND RECORDING MEDIUM

(71) Applicant: FUJITSU LIMITED, Kawasaki-shi, Kanagawa (JP)

(72) Inventors: Keiju Okabayashi, Sagamihara (JP); Bin Chen, Machida (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 0 days.

(21) Appl. No.: 15/478,739

(22) Filed: Apr. 4, 2017

(65) Prior Publication Data
US 2017/0300284 A1 Oct. 19, 2017

(30) Foreign Application Priority Data

Apr. 15, 2016 (JP) ................................ 2016-082320
Aug. 26, 2016 (JP) ................................ 2016-165654

(51) Int. Cl.
*G06F 3/14* (2006.01)
*G06F 3/0346* (2013.01)
(Continued)

(52) U.S. Cl.
CPC ............ *G06F 3/1454* (2013.01); *G06F 3/017* (2013.01); *G06F 3/0346* (2013.01); *G06F 21/30* (2013.01); *H04L 67/42* (2013.01); *H04W 88/02* (2013.01)

(58) Field of Classification Search
CPC ........ G06F 3/14; G06F 3/0346; G06F 3/1454; H04W 12/06; H04W 88/02; H04W 4/02; H04L 63/083; H04L 63/08
See application file for complete search history.

(56) References Cited

U.S. PATENT DOCUMENTS

| 2005/0212911 | A1 | 9/2005 | Marvit et al. | |
| 2013/0160088 | A1* | 6/2013 | McFarland | H04W 12/06 726/4 |
| 2013/0204401 | A1* | 8/2013 | Yamaguchi | G05B 11/01 700/17 |

FOREIGN PATENT DOCUMENTS

| JP | 2003-44444 | 2/2003 |
| JP | 2003-333559 | 11/2003 |

(Continued)

OTHER PUBLICATIONS

Espacenet Bibliographic data, Japanese Publication No. 2003-333559, published Nov. 21, 2003.

(Continued)

*Primary Examiner* — Michael Faragalla
(74) *Attorney, Agent, or Firm* — Staas & Halsey LLP

(57) ABSTRACT

Disclosed is a server apparatus for providing authentication information to associate a client terminal with a plurality of display apparatuses capable of displaying a content distributed from the client terminal. The server apparatus includes a storage configured to store authentication pattern information associated with information relating to operations of the client terminal; and an issuing unit configured to issue the authentication pattern information stored in the storage to a display apparatus on which an operation has been performed by the user, among the plurality of display apparatuses, in a mode of disabling issuing a same item of authentication pattern information in a period from issuing the authentication pattern information to receiving return of the authentication pattern information from the display apparatus.

15 Claims, 25 Drawing Sheets

(51) Int. Cl.
*G06F 3/01* (2006.01)
*G06F 21/30* (2013.01)
*H04L 29/06* (2006.01)
*H04W 88/02* (2009.01)

(56) References Cited

FOREIGN PATENT DOCUMENTS

| | | |
|---|---|---|
| JP | 2009-251896 | 10/2009 |
| JP | 2013-179586 | 9/2013 |
| JP | 2015-70345 | 4/2015 |

OTHER PUBLICATIONS

Espacenet Bibliographic data, Japanese Publication No. 2009-251896, published Oct. 29, 2009.
Japanese Platform for Patent Information, Publication No. 2015-70345, published Apr. 13, 2015.
Japanese Platform for Patent Information, Publication No. 2013-179586, published Sep. 9, 2013.
Espacenet Bibliographic data, Japanese Publication No. 2003-44444, published Feb. 14, 2003.
Extended European Search Report for corresponding European Patent Application No. 17163985.9, dated Sep. 18, 2017**.

* cited by examiner

SHAKE MOBILE TERMINAL

FIG.2A
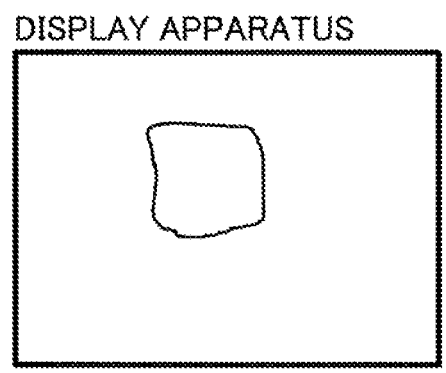
FIG.2B
MR. A    MR. B    MR. C 
MULTIPLE USERS SHAKE SIMULTANEOUSLY
FIG.2C
MR. A
MR. B   ?
MR. C

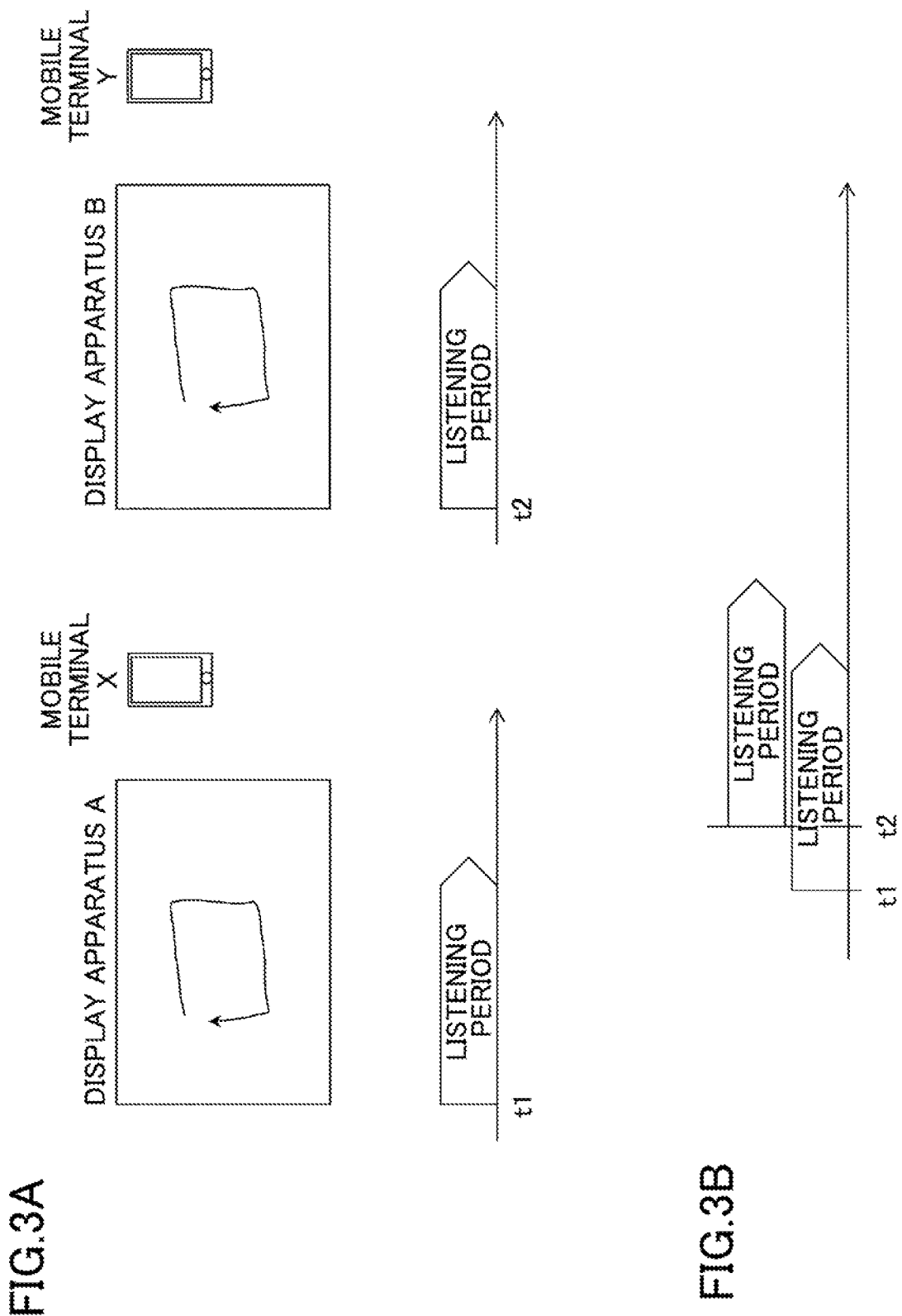

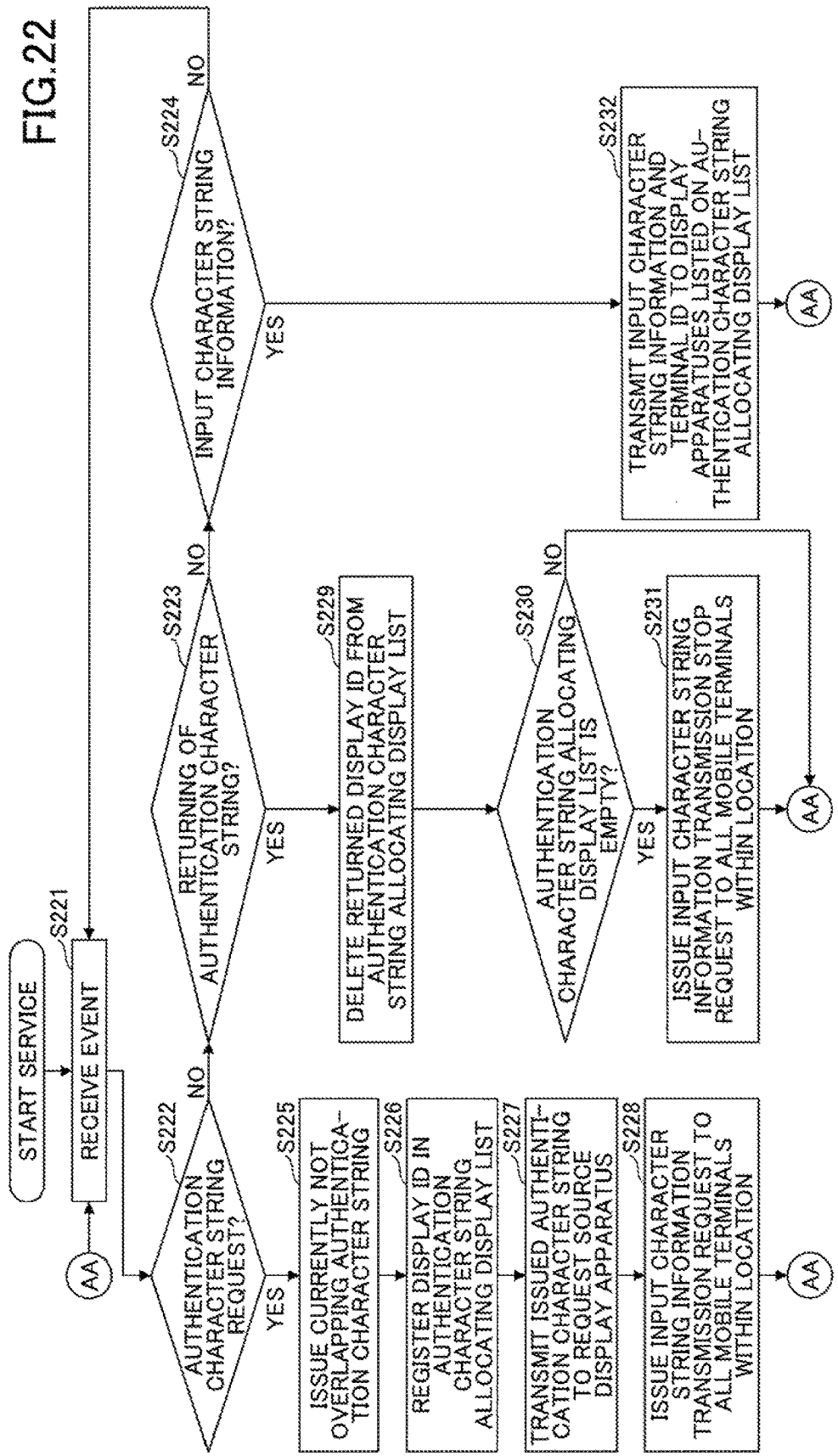

SERVER APPARATUS, CONTENT DISPLAY CONTROL SYSTEM, AND RECORDING MEDIUM

CROSS-REFERENCE TO RELATED APPLICATIONS

This application is based upon and claims the benefit of priority of the prior Japanese Patent Application No. 2016-082320, filed on Apr. 15, 2016, and Japanese Patent Application No. 2016-165654, filed on Aug. 26, 2016, the entire contents of which are incorporated herein by reference.

FIELD

The embodiments discussed herein relate to a server apparatus, and a content display control system.

BACKGROUND

An environment (location) has been considered for use in a potential technology to hold workshops by coordinating multiple large-sized display apparatuses disposed on a wall surface of a room or disposed on a desk with a mobile terminal such as a smartphone or the like possessed by each user. In such an environment, an aspect of the technology may be to display a screen (content) displayed on the mobile terminal possessed by each user at a desired position of a desired one of the display apparatuses. Under such an environment where multiple display apparatuses and multiple mobile terminals are present, the position of the mobile terminal needs to be linked with the position of the display apparatus by some method in order to display the screen of a certain mobile terminal at a desired position on the desired display apparatus.

FIGS. 1A to 1C are diagrams illustrating an example of linking a frame drawn on a display apparatus with a mobile terminal. As illustrated in FIG. 1A, a user draws a frame corresponding to a display area with a finger or a pen on one of the display apparatuses. Thereafter, as illustrated in FIG. 1B, the frame on the display apparatus and the mobile terminal are linked by shaking the mobile terminal. As a result, as illustrated in FIG. 1C, the screen of the mobile terminal is transferred to the display area of the display apparatus, and the screen of the mobile terminal is displayed on the display area of the display apparatus.

There are known in the art a technology of pairing a display apparatus and a mobile terminal for coordinating the display apparatus with the mobile terminal, or a technology of performing personal authentication at login by vocalization according to guidance (e.g., Patent Documents 1 and 2).

RELATED-ART DOCUMENTS

Patent Documents

Patent Document 1: Japanese Laid-open Patent Publication No. 2013-179586
Patent Document 2: Japanese Laid-open Patent Publication No. 2003-044444

SUMMARY

According to an aspect of embodiments, there is disclosed a server apparatus for providing authentication information to associate a client terminal with a plurality of display apparatuses capable of displaying a content distributed from the client terminal. The server apparatus includes a storage configured to store authentication pattern information associated with information relating to operations of the client terminal; and an issuing unit configured to issue the authentication pattern information stored in the storage to a display apparatus on which an operation has been performed by the user, among the plurality of display apparatuses, in a mode of disabling issuing a same item of authentication pattern information in a period from issuing the authentication pattern information to receiving return of the authentication pattern information from the display apparatus.

The object and advantages of the invention will be realized and attained means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIGS. 2A to 2C are diagrams illustrating an example in which a link between a frame drawn on a display apparatus and a mobile terminal fails;
FIGS. 3A and 3B are diagrams illustrating an example in which a link between a frame drawn on a display apparatus and a mobile terminal fails in a case where there are two or more display apparatuses.

FIG. 22 is a flowchart illustrating another process example of the server apparatus;

DESCRIPTION OF EMBODIMENTS

The following may need to be considered with the above-described method of performing operations such as shaking subsequent to drawing of the frame. FIGS. 2A to 2C are diagrams illustrating an example in which a link between a frame drawn on a display apparatus and a mobile terminal fails. That is, as illustrated in FIG. 2A, any one of users draws a frame corresponding to a display area with a finger or a pen on any one of the display apparatuses. Thereafter, as illustrated in FIG. 2B, when two or more users shake their mobile terminals substantially at the same time, it may be difficult to determine which user's mobile terminal is to be linked with the frame (display area) on the display apparatus (see FIG. 2C).

FIGS. 3A and 3B are diagrams illustrating an example in which a link between a frame drawn on a display apparatus and a mobile terminal fails in a case where there are two or more display apparatuses. As illustrated in FIG. 3A, it is assumed that a user of a mobile terminal X draws a frame on a display apparatus A and a user of a mobile terminal Y draws a frame on a display apparatus B, almost at the same time. In each of the display apparatuses A and B, the operation such as the shaking of the mobile terminal is monitored for a predetermined listening period from the time at which the frame is recognized; however, the listening periods overlap as illustrated in FIG. 3B. Hence, when an operation is performed on each of the mobile terminals X and Y within the overlapping period, it may be difficult to identify which mobile terminal has performed which operation (shake, etc.).

These will not be solved by the technologies disclosed in the aforementioned related art documents.

The following illustrates preferred embodiments with reference the accompanying drawings.

Configuration

Figure 1A:
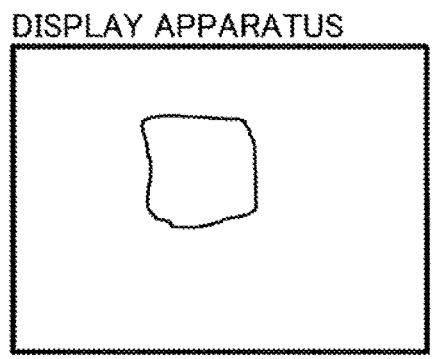
FIGS. 1A to 1C are diagrams illustrating an example in which a frame drawn on a display apparatus is linked with a mobile terminal.
Figure 1B:
Figure 1C:
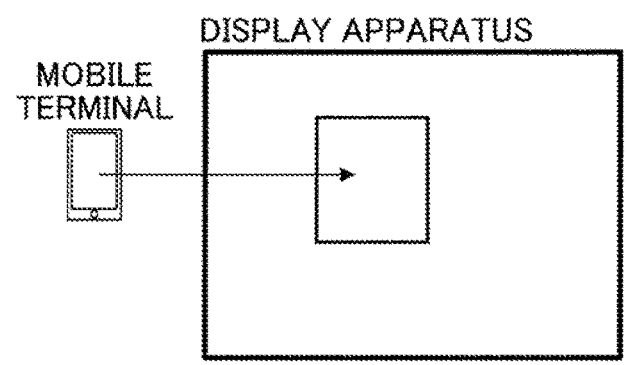
Figure 4:
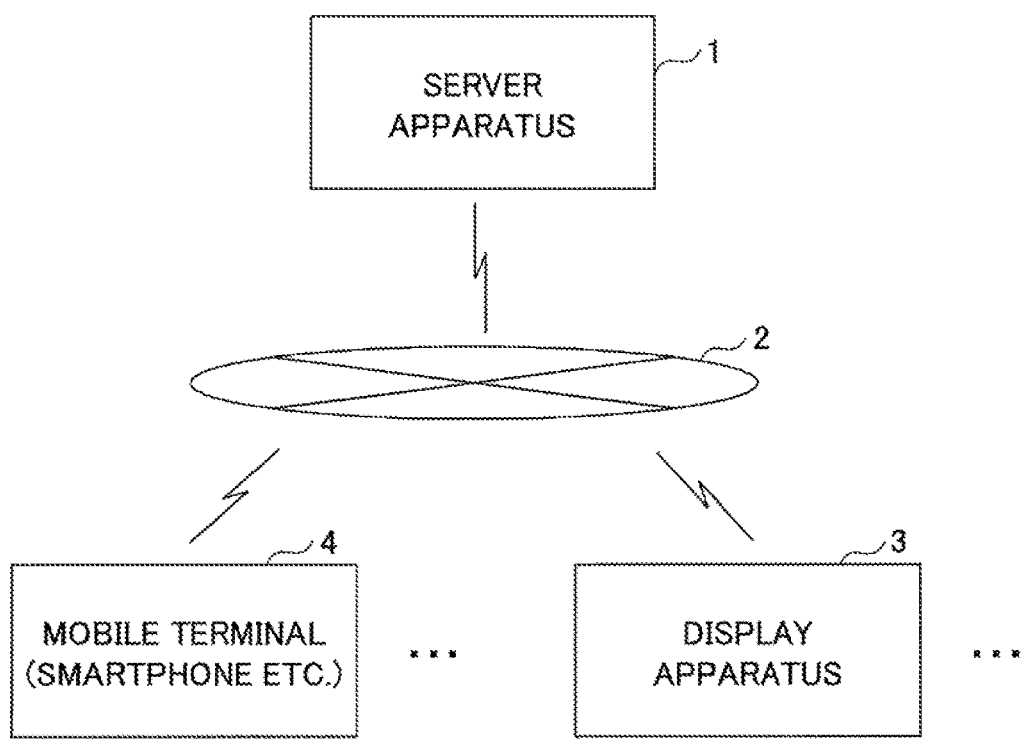
FIG. 4 is a diagram illustrating a configuration example of a system according to an embodiment.

FIG. 4 is a diagram illustrating a configuration example of a system according to an embodiment. In FIG. 4, the server apparatus 1, multiple display apparatuses 3, and multiple mobile terminals 4 are connected to one another so as to communicate with one another via a network 2 (wired or wireless) such as a LAN (Local Area Network) and the like. The server apparatus 1 has a function to lend an authentication motion pattern for use in identifying (authenticating) the mobile terminal 4 to the display apparatus 3 and receive the authentication motion pattern that has been used and returned from the display apparatus 3. The server apparatus 1 also has a function to transfer terminal motion information for authentication transmitted from the mobile terminal 4 to the display apparatus 3 serving as a candidate (hereinafter also referred to as the "candidate display apparatus 3").

The display apparatus 3 has a large-sized display (including a liquid crystal display and the like as well as a projector), and also has a function of a PC (personal computer) that performs information processing. The mobile terminal 4 is an information apparatus such as a smartphone. The server apparatus 1 may be integrated with any one of the display apparatuses 3.

In the following description, it is assumed that one screen displayed on the mobile terminal 4 is linked with one frame of any one of the display apparatuses 3. Note that such a configuration may also be expanded in order to link one screen of the mobile terminal 4 with the frame of one or multiple display apparatuses 3 or to link multiple screens of the mobile terminal 4 to the frame of one or multiple display apparatuses 3.

Figure 5:
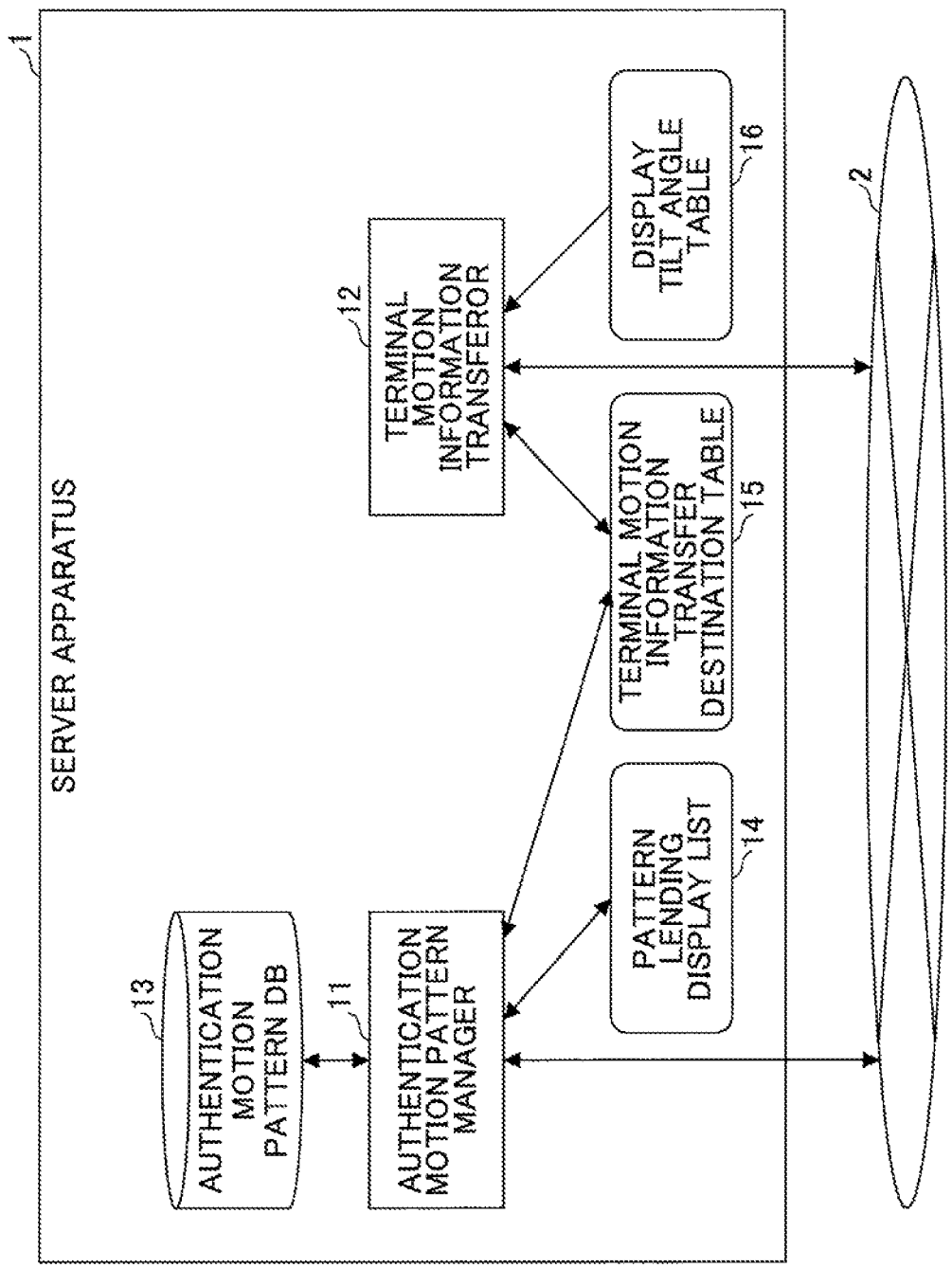
FIG. 5 is a diagram illustrating a functional configuration example of a server apparatus.

FIG. 5 is a diagram illustrating a functional configuration example of the server apparatus 1. In FIG. 5, the server apparatus 1 includes an authentication motion pattern manager 11, a terminal motion information transferor 12, an authentication motion pattern DB 13, a pattern lending display list 14, a terminal motion information transfer destination table 15, and a display tilt angle table 16.

When receiving an authentication motion pattern acquisition request from any one of the display apparatuses 3 via the network 2, the authentication motion pattern manager 11 extracts one of the authentication motion patterns from the authentication motion pattern DB 13, and transmits the extracted authentication motion pattern to the request source display apparatus 3. In this case, all the information forming the authentication motion patterns may be transmitted; alternatively, in a case where the display apparatus 3 holds in advance information on the same content as the authentication motion pattern DB 13, an ID for identifying the authentication motion pattern (a pattern ID) may be transmitted. The lent authentication motion pattern is managed such that the same authentication motion pattern will not be lent to another display apparatus redundantly (in an overlapped manner). In addition, the authentication motion pattern manager 11 records, in the pattern lending display list 14, an ID (a display ID) of the display apparatus 3 that has lent the authentication motion pattern. Note that in a case where the authentication motion pattern manager 11 has lent the authentication motion pattern, the authentication motion pattern manager 11 transmits a terminal motion information transmission request to all the mobile terminals 4 present in a predetermined location (a predetermined range in which the multiple display apparatuses 3 may be used).

The authentication motion pattern manager 11 has a function to return the authentication motion pattern to the authentication motion pattern DB 13 upon receiving an authentication motion pattern returning request from the display apparatus 3. The authentication motion pattern manager 11 deletes, from the pattern lending display list 14, the ID (display ID) of the display apparatus 3 that has returned the authentication motion pattern while deleting a combination of the corresponding display ID and terminal ID from the terminal motion information transfer destination table 15. Further, in a case where there are no lent authentication motion patterns left, the authentication motion pattern manager 11 transmits a terminal motion information transmission stop request to all mobile terminals 4 present in a predetermined location.

Figure 6:
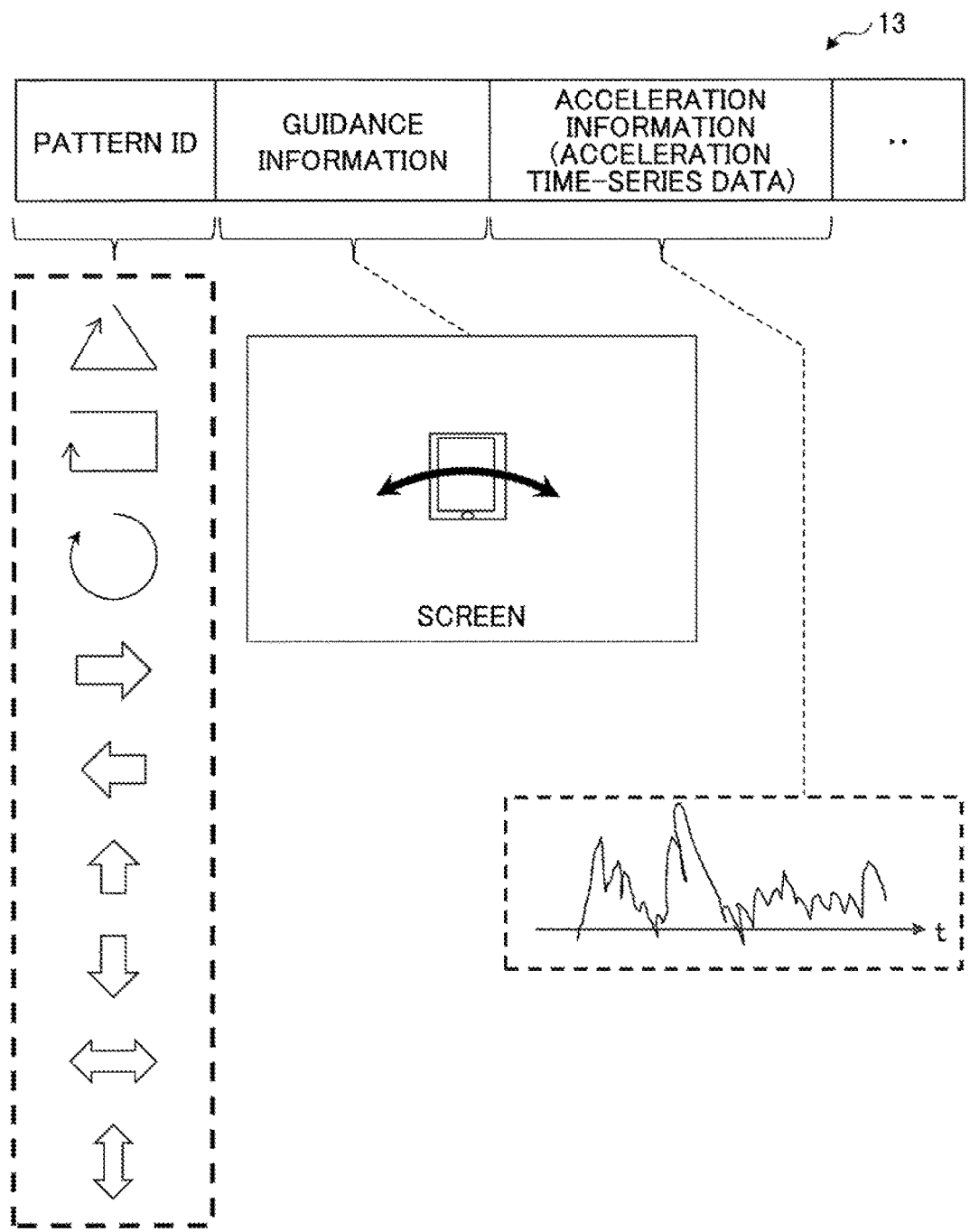
FIG. 6 is a diagram illustrating an example of a data structure of an authentication motion pattern DB.

FIG. 6 is a diagram illustrating an example of the data structure of the authentication motion pattern DB 13, which includes items such as a "pattern ID", "guidance information", "acceleration information", and the like. The "Pattern ID" is information that identifies the authentication motion pattern. Operations corresponding to the authentication motion pattern may, for example, include moving the mobile terminal 4 in a triangular shape, moving the mobile terminal 4 in a rectangular shape, moving the mobile terminal 4 to draw a circle, moving the mobile terminal 4 in any one of a right direction, a left direction, an upward direction and a downward direction, moving the mobile terminal 4 in left and right directions or in up and down directions, and the like.

The "guidance information" includes information such as moving images (animation), still images, text, voice, or the like that teaches how to operate in order to make the user understand what operation needs to be performed for each of the authentication motion patterns. The "acceleration information" is acceleration time-series data recorded by actually performing an operation in advance for of the authentication motion patterns in order to determine whether the operation actually performed by the user matches the operation defined by the authentication motion pattern.

Figure 7A:
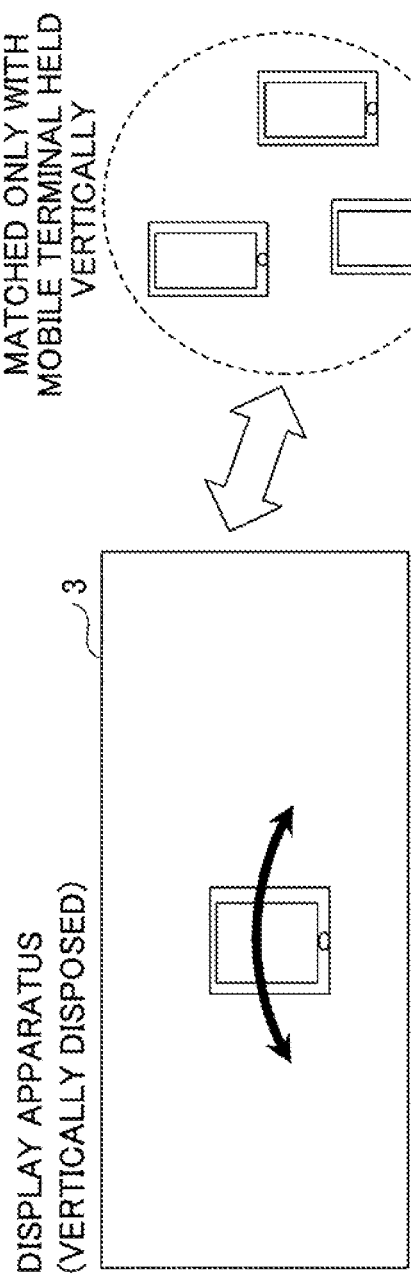
FIGS. 7A and 7B are diagrams illustrating an example of extraction by the display apparatus in accordance with tilt angles of the mobile terminals.
Figure 7B:
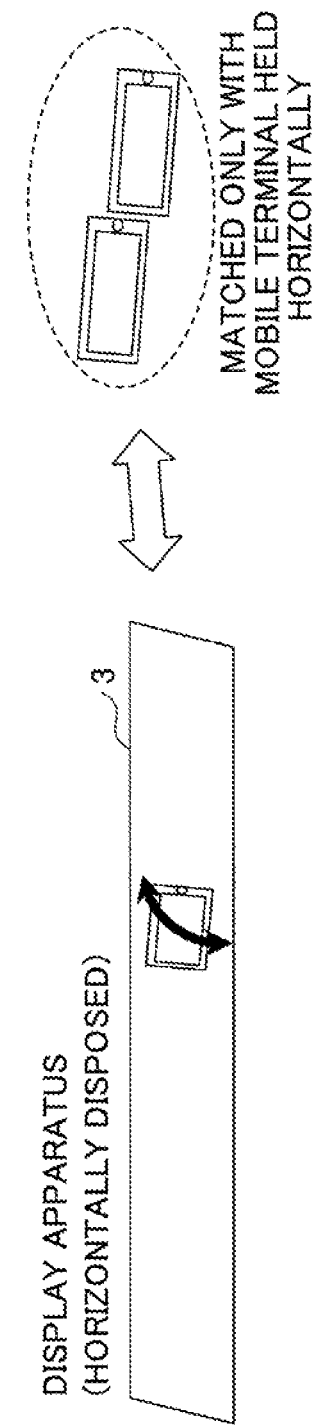

Referring back to FIG. 5, the terminal motion information transferor 12 has a function to refer to the display tilt angle table 16 based on the tilt angle information of the mobile terminal 4 included in the terminal motion information to extract the candidate display apparatuses 3 in a case where the terminal motion information transferor 12 receives the terminal motion information from the mobile terminal 4. FIGS. 7A and 7B are diagrams illustrating an example of extraction by the display apparatus 3 in accordance with tilt angles of the mobile terminals 4. As illustrated in FIG. 7A, acceleration information from the mobile terminals 4 having a tilt angle of 90 degrees is transferred to the vertically placed display apparatus 3. As illustrated in FIG. 7B, acceleration information from the mobile terminals 4 having a tilt angle of 0 degrees is transferred to the horizontally placed display apparatus 3. When moving the mobile terminal 4 according to the guidance, it is natural to align the display surface direction of the display apparatus 3 with the display surface direction of the mobile terminal 4. Hence, the moving operation of the mobile terminal 4 is handled as an operation with respect to the display apparatus 3 only when the display surface directions of the display apparatus 3 and the mobile terminal 4 are matched.

Referring back to FIG. 5, the terminal motion information transferor 12 has a function to transfer acceleration information included in the terminal motion information from the mobile terminal 4 to the extract the candidate display apparatus 3. Note that the tilt angle determined as being matched as a result is registered in the terminal motion information transfer destination table 15 to be reused.

Figure 8A:
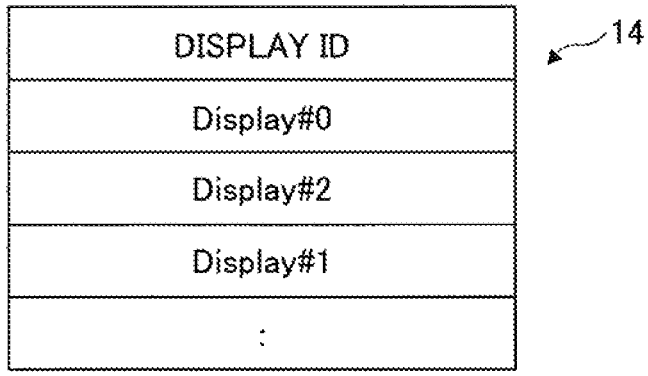
FIGS. 8A to 8C are diagrams illustrating examples of data structures of various lists and tables.
Figure 8B:
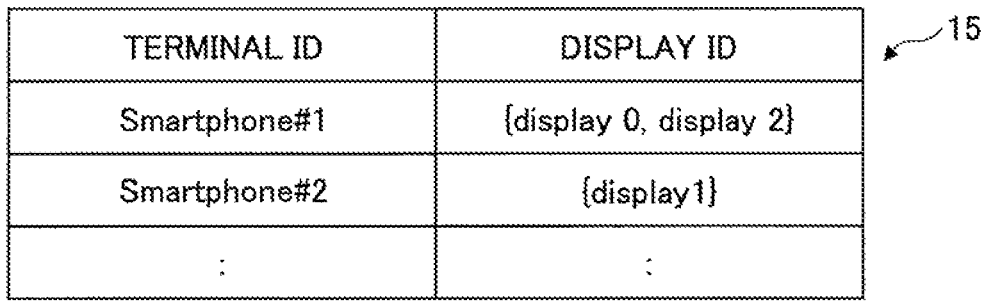
Figure 8C:
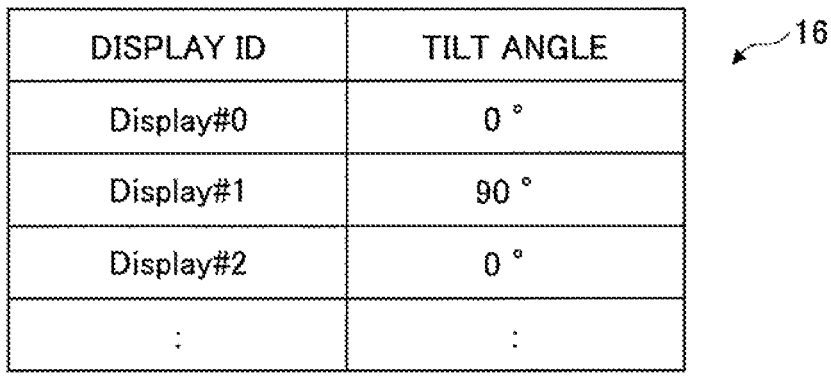

FIGS. 8A to 8C are diagrams illustrating examples of data structures of various lists and tables. The pattern lending display list 14 lists display IDs. The terminal motion information transfer destination table 15 includes each terminal ID in association with one or more display ID (s). The display tilt angle table 16 includes a tilt angle set for each of the display IDs.

Figure 9:
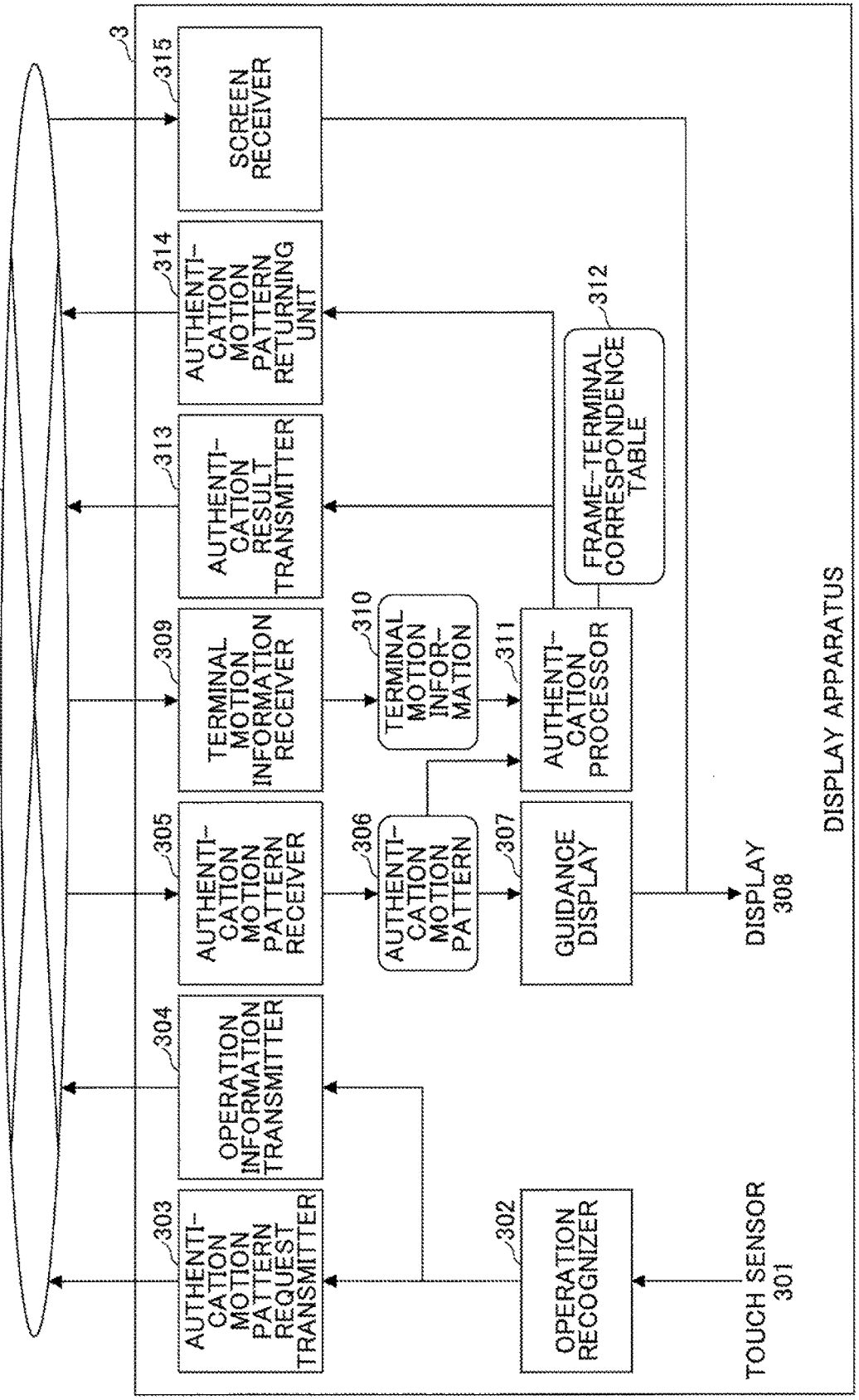
FIG. 9 is a diagram illustrating a functional configuration example of a server apparatus.

Next, FIG. 9 is a diagram illustrating a functional configuration example of the display apparatus 3. In FIG. 9, the display apparatus 3 includes an operation recognizer 302, an authentication motion pattern request transmitter 303, and an operation information transmitter 304. The display apparatus 3 further includes an authentication motion pattern receiver 305, a guidance display 307, terminal motion information receiver 309, an authentication processor 311, an authentication result transmitter 313, an authentication motion pattern returning unit 314, and a screen receiver 315.

The operation recognizer 302 has a function to recognize an operation based on coordinates of a contact position of a user's finger, a pen, or the like on the screen by a touch sensor 301 disposed on the front surface of a display 308. For example, when a rectangular frame is drawn, the operation recognizer 302 recognizes a frame drawing operation. Note that it may be possible to use another mechanism to obtain the coordinates of the contact position by the user's finger or the pen on the screen instead of the touch sensor 301. The authentication motion pattern request transmitter 303 has a function to transmit an authentication motion pattern request to the server apparatus 1 when the operation recognizer 302 recognizes (detects) the frame drawing operation.

The authentication motion pattern receiver 305 has a function to receive the authentication motion pattern from the server apparatus 1 to hold the received authentication motion pattern as an authentication motion pattern 306. The guidance display 307 has a function to display guidance moving images or the like on the display screen of the display 308, for example, within the frame that has been recognized, formatted and displayed, based on the guidance information included in the authentication motion pattern 306.

The terminal motion information receiver 309 has a function to receive terminal motion information (acceleration information) from the mobile terminal 4 transferred from the server apparatus 1 to hold the received terminal motion information as terminal motion information 310. The authentication processor 311 has a function to match the acceleration information of the authentication motion pattern 306 with the acceleration information of the terminal motion information 310 to determine whether these are the same authentication motion pattern. The authentication processor 311 determines that the terminal motion information 310 matches the authentication motion pattern 306, the authentication processor 311 registers a frame (frame ID, XY coordinates) linked with the terminal ID in a frame-terminal correspondence table 312. The authentication result transmitter 313 has a function to transmit the display ID to the corresponding mobile terminal 4 as an authentication result indicating that the authentication has been performed by the authentication processor 311.

The authentication motion pattern returning unit 314 has a function to return to the server apparatus 1 the authentication motion pattern for which authentication has been completed in the authentication processor 311 or the authentication motion pattern for which authentication has not been performed due to the time being up. Upon returning the authentication motion pattern, it is not necessary to transmit all the information forming the authentication motion patterns, but the pattern ID may be specified. Upon returning the authentication motion pattern, the display ID that has used the authentication motion pattern and, when there is, the terminal ID of the linked mobile terminal 4 are also transmitted.

The screen receiver 315 has a function to receive an application screen from the linked mobile terminal 4 to display the received application screen on the display 308. The operation information transmitter 304 has a function to transmit, to the mobile terminal 4, the operation (enlargement/reduction, movement, page feed/return, point, etc., of the screen) of the application screen within the frame recognized by the operation recognizer 302. The mobile terminal 4 that has received the operation information performs screen transition according to the operation information and transmits an update screen. The transmitted update screen is then received by the screen receiver 315 to thereby perform screen update of the display 308.

Figure 10:
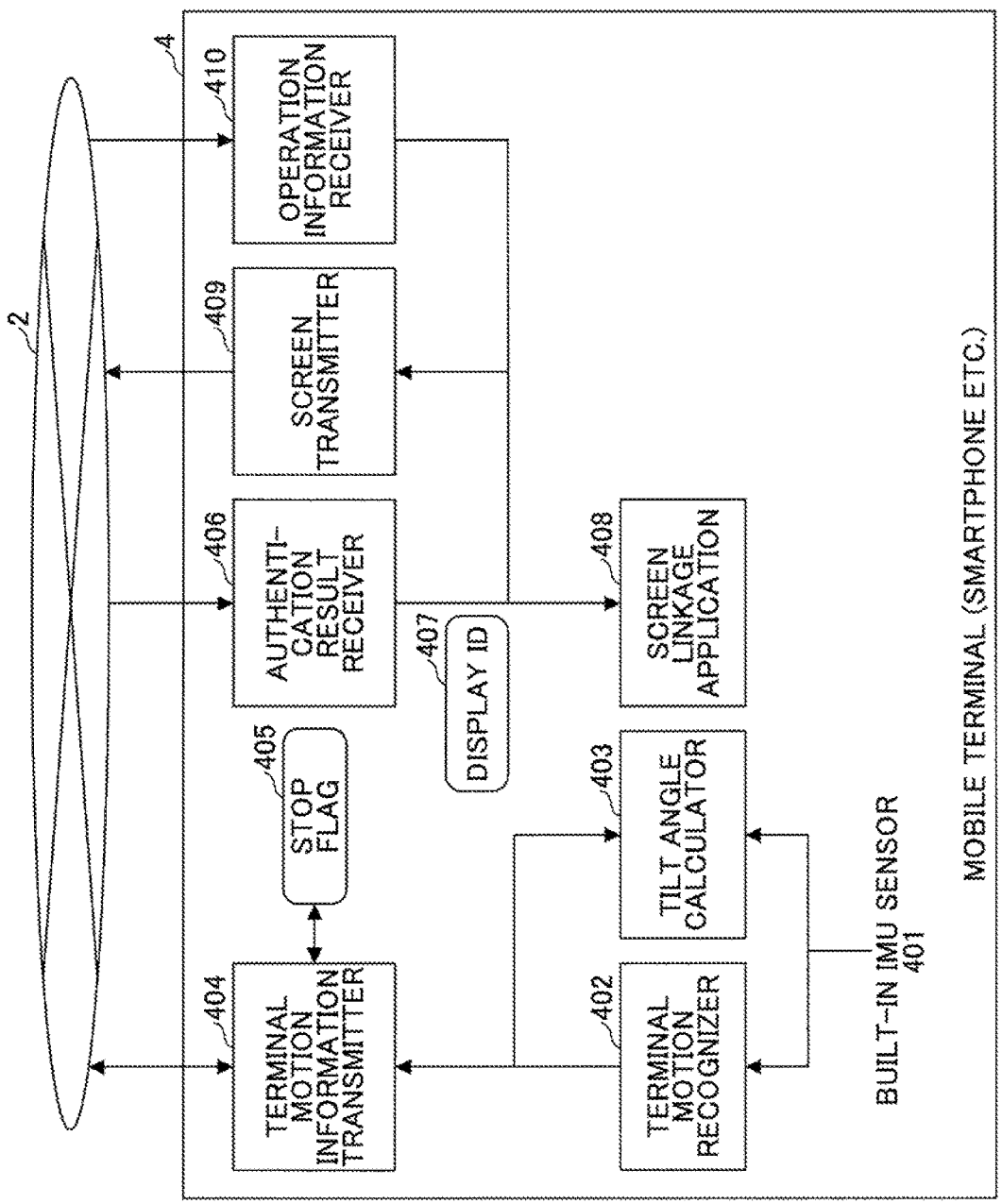
FIG. 10 is a diagram illustrating an example of a functional configuration of a mobile terminal.

Next, FIG. 10 is a diagram illustrating a functional configuration example of the mobile terminal 4. In FIG. 10, the mobile terminal 4 includes a terminal motion recognizer 402, a tilt angle calculator 403, a terminal motion information transmitter 404, an authentication result receiver 406, a screen linkage application 408, a screen transmitter 409, an operation information receiver 410.

The terminal motion recognizer 402 has a function to recognize the motion or movement (mainly acceleration change) of the mobile terminal 4 itself from the signal of a built-in IMU (Inertial Measurement Unit) sensor 401. The tilt angle calculator 403 has a function to calculate the tilt angle of the mobile terminal 4 similarly from the built-in IMU sensor 401. The terminal motion information transmitter 404 has a function to transmit terminal motion information to the server apparatus 1 based on the motion or movement recognized by the terminal motion recognizer 402 and the tilt angle calculated by the tilt angle calculator 403. Note that the terminal motion information transmitter 404 has a stop flag 405 and the terminal motion information transmitter 404 operates only when the stop flag 405 is OFF. The stop flag 405 is switched OFF when a terminal motion information transmission request is transmitted from the server apparatus 1. When a terminal motion information transmission cancelling request is transmitted from the server apparatus 1 or when an authentication result that the linking has completed is obtained from the display apparatus 3, the stop flag 405 is switched ON.

The authentication result receiver 406 has a function to receive, from, the display apparatus 3, the authentication result that has been linked to hold the display ID included in the received authentication result as a display ID 407. The screen linkage application 408 is a process entity of an application program for providing a screen to be displayed on the display apparatus 3. The screen transmitter 409 has a function to transmit a screen of the screen linkage application 408 to the linked display apparatus 3. The operation information receiver 410 has a function to receive operation information with respect to the screen from the display apparatus 3 to transfer the received operation information to the screen linkage application 408.

Figure 11:
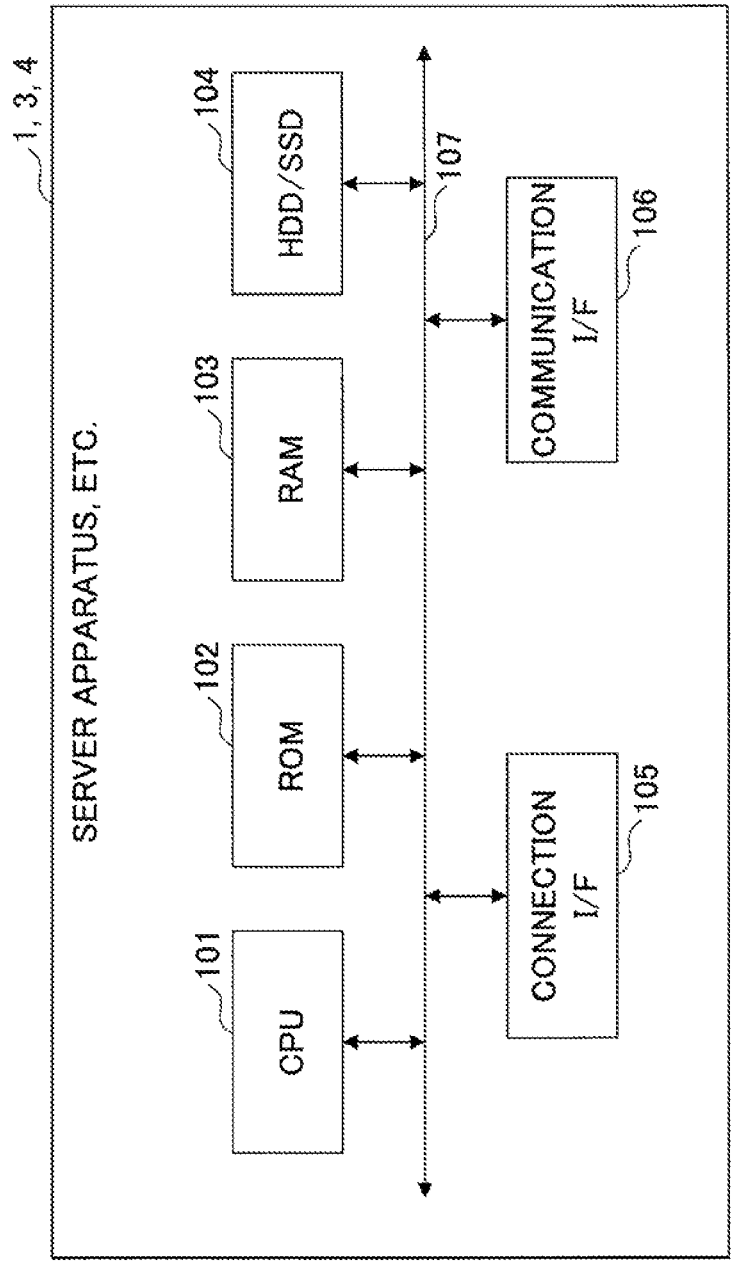
FIG. 11 is a diagram illustrating an example of a hardware configuration in association with information processing of a server apparatus, a display apparatus, and a mobile terminal.

FIG. 11 is a diagram illustrating an example of a hardware configuration in association with information processing of the server apparatus 1, the display apparatus 3, and the mobile terminal 4. In FIG. 11, the server apparatus 1 and the like include a CPU (Central Processing Unit) 101, a ROM (Read Only Memory) 102, and a RAM (Random Access Memory) 103 that are mutually connected via a bus 107. The server apparatus 1 and the like further include a HDD (Hard Disk Drive)/SSD (Solid State Drive) 104, a connection I/F (Interface) 105, and a communication I/F 106. The CPU 101 is configured to integrally control operations of the server apparatus 1 by executing programs stored in the ROM 102 or in one of the HDD24 and the SSD 104, using the RAM 103 as a work area. The connection I/F 105 is configured to serve as an interface with an apparatus connected to the server apparatus 1 and the like. The communication I/F 106 is an interface for performing communications with other information apparatuses via a network.

The functions of the respective apparatuses described with reference to FIGS. 5, 9, and 10 are implemented by executing predetermined programs in the CPU 101. Such programs may be acquired via a recording medium, may be acquired via a network, or may be embedded in a ROM. Data to be referred to or updated at the time of processing is held in the RAM 103 or the HDD/SSD 104. In addition, in the display apparatus 3, the display 308 configured to display a screen and the touch sensor 301 are connected to the connection I/F 105. In the mobile terminal 4, a display configured to display a screen, a touch sensor and a built-in IMU sensor 401 are connected to the connection I/F 105.

Operations

Figure 12:
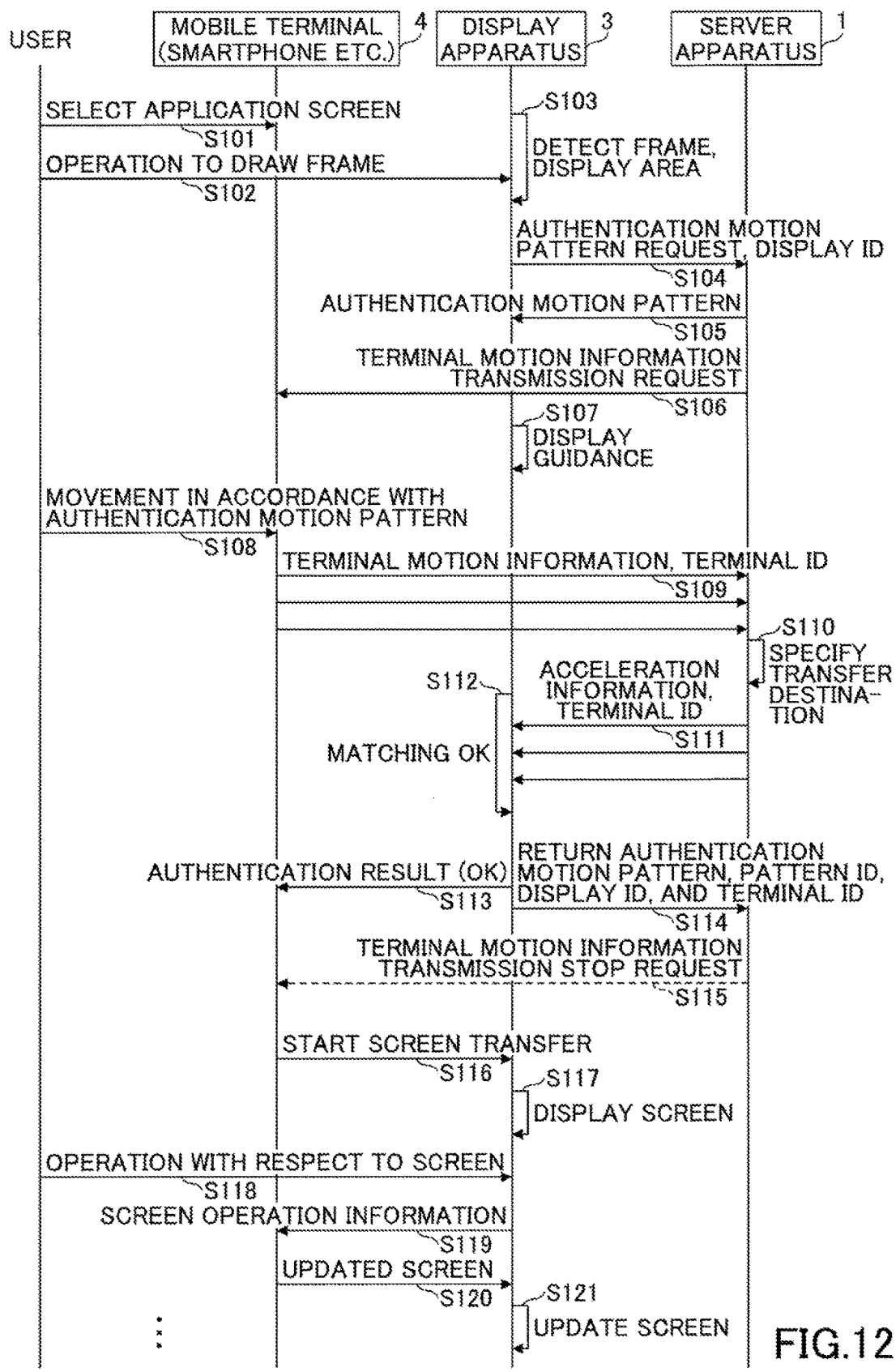
FIG. 12 is a sequence diagram illustrating a process example according to an embodiment.
Figure 13A:
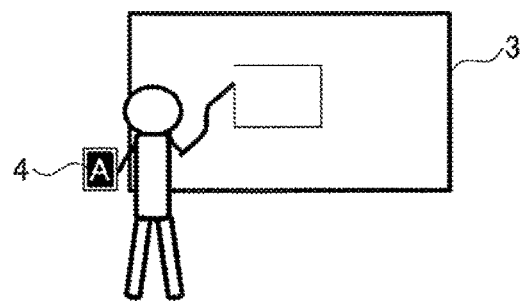
FIGS. 13A to 13E are diagrams illustrating operation examples and display examples.

FIG. 12 is a sequence diagram illustrating a process example according to the embodiment. In FIG. 12, a user of the mobile terminal 4 selects a screen desired to be displayed on the display apparatus 3 from the screen linkage application 408 of the mobile terminal 4 (step S101), and traces a frame corresponding to a display area with a finger, a pen, and the like on the screen of the desired display apparatus 3 to draw the frame (step S102). FIG. 13A illustrates a state in which the screen "A" is displayed on the mobile terminal 4 and the user draws a rectangular frame on the display apparatus 3.

Figure 13B:
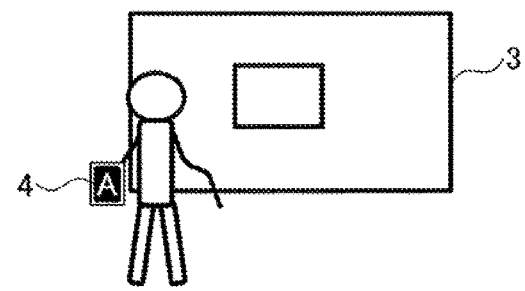

Referring back to FIG. 12, when the operation recognizer 302 of the display apparatus 3 detects that a frame has been drawn, the operation recognizer 302 displays the display area that has been formatted on the screen (step S103). FIG. 13B illustrates a state in which the display area is displayed on the screen of the display apparatus 3.

Referring back to FIG. 12, the authentication motion pattern request transmitter 303 of the display apparatus 3 transmits an authentication motion pattern request to the server apparatus 1 with the display ID of the display apparatus 3 itself (step S104). In response to this request, the authentication motion pattern manager 11 of the server apparatus 1 extracts one of the authentication motion patterns from the authentication motion pattern DB 13 and transmits the extracted authentication motion pattern to the request source display apparatus 3 (step S105). The authentication motion pattern extracted so as not to lend the same authentication motion pattern redundantly (in an overlapped manner); for example, the same authentication motion pattern will not be lent by removing the authentication motion pattern redundantly (in an overlapped manner) at the end of the permutation of the authentication motion pattern from the permutation. In addition, the authentication motion pattern manager 11 transmits a terminal motion information transmission request to all the mobile terminals 4 being present in a predetermined location (a predetermined range in which multiple display apparatuses 3 may be used) (step S106).

Figure 13C:
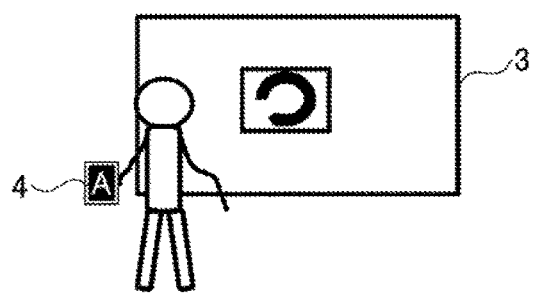

The display apparatus 3 displays the guidance on the guidance display 307 based on the authentication motion pattern received by the authentication motion pattern receiver 305 (step S107). FIG. 13C illustrates a state in which guidance for instructing a user to move the user's mobile terminal 4 in a clockwise direction is displayed in the display area of the display apparatus 3.

Figure 13D:
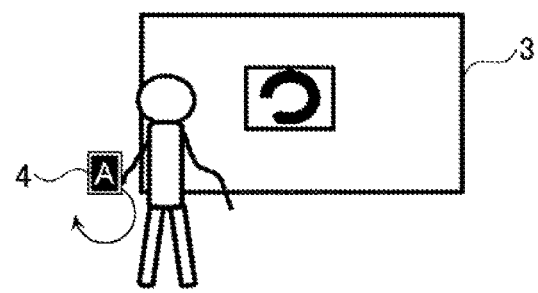

Referring back to FIG. 12, when the user of the mobile terminal 4 moves the user's mobile terminal 4 according to the guidance of the authentication motion pattern (step S108), the terminal motion recognizer 402 recognizes the terminal motion (acceleration change), and the tilt angle calculator 403 calculates the tilt angle of the mobile terminal 4. Subsequently, the terminal motion information transmitter 404 transmits the terminal motion information including those described above to the server apparatus 1 together with the terminal ID of the user's mobile terminal itself (step S109). FIG. 13D illustrates a state in which the user moves the mobile terminal 4 in a clockwise direction according to the guidance.

Referring back to FIG. 12, the terminal motion information transferor 12 of the server apparatus 1 refers to the display tilt angle table 16 to specify the transfer destination display apparatus 3 based on the tilt angle of the terminal motion information received from the mobile terminal 4

(Step S110). Note that the terminal ID and the display ID that are linked based on the tilt angle are stored in the terminal motion information transfer destination table 15, and hence, it is not necessary to determine the tilt angle every time the transfer destination display apparatus 3 is specified. Subsequently, the terminal motion information transferor 12 transmits the acceleration information of the terminal motion information to the specified display apparatus 3 together with the terminal ID (step S111).

When the terminal motion information receiver 309 of the display apparatus 3 receives the terminal motion information (acceleration information) the authentication processor 311 matches the received terminal motion information (the received acceleration information) with the acceleration information of the previously acquired authentication motion pattern (step S112). In this case, when the authentication processor 311 determines that the received terminal motion information (the received acceleration information) matches the acceleration information of the previously acquired authentication motion pattern (step S112), the authentication result transmitter 313 transmits the display ID to the mobile terminal 4 as an authentication result indicating that the authentication has been successful (step S113). The authentication motion pattern returning unit 314 returns the authentication motion pattern to the server apparatus 1 together with the pattern ID, the display ID, and the terminal ID (when there is any) (step S114). The authentication motion pattern manager 11 of the server apparatus 1 returns the returned authentication motion pattern to the authentication motion pattern DB 13. For example, in a case where the authentication motion pattern is lent by removing the authentication motion pattern at the end of the permutation of the authentication motion pattern from the permutation, the returning of the authentication motion pattern is completed by adding the returned authentication motion pattern back to the end of the permutation again. Further, in a case where there are no lent authentication motion patterns left as a result of the returning of the authentication motion pattern, the authentication motion pattern manager 11 transmits a transmission stop request of the terminal motion information to all mobile terminals 4 present in a predetermined location (step S115).

Figure 13E:
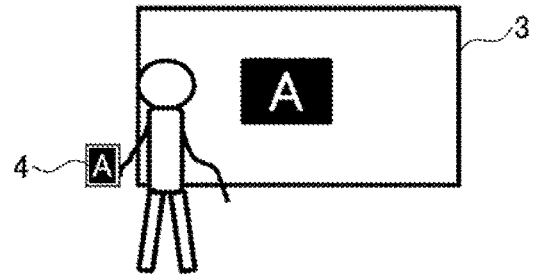

The mobile terminal 4 that has received the authentication result indicating that the authentication has been successful from the authentication result receiver 406 starts transferring, by the screen transmitter 409, the screen of the screen linkage application 408 to the display apparatus 3 to which the mobile terminal 4 is linked (step S116). Note that it is assumed that the transfer of the screen maybe voluntarily started by the mobile terminal 4 in this embodiment; however, the transfer of the screen may be requested by the display apparatus 3 such that the mobile terminal 4 may start transferring the screen in response to the request. Upon receiving the screen, the screen receiver 315 of the display apparatus 3 displays the received screen on the display 308 (step S117). FIG. 13E illustrates a state in which the screen "A" of the mobile terminal 4 is displayed in the display area of the display apparatus 3.

Referring back to FIG. 12, when any one of users subsequently performs an operation with respect to the area where the screen of the display apparatus 3 is displayed (step S118), the operation recognizer 302 of the display apparatus 3 recognizes the operation. The operation information transmitter 304 then transmits operation information to the corresponding mobile terminal 4 (step S119). When the operation information receiver 410 of the mobile terminal 4 receives the operation information, the screen linkage application 408 updates the screen according to the content of the operation, and the screen transmitter 409 transmits the updated screen to the display apparatus 3 (step S120). Upon receiving the updated screen, the screen receiver 315 of the display apparatus 3 displays the received updated screen on the display 308 (screen updated) (step S121).

The following illustrates detailed operations of the server apparatus 1, the display apparatus 3 and the mobile terminal 4.

Figure 14:
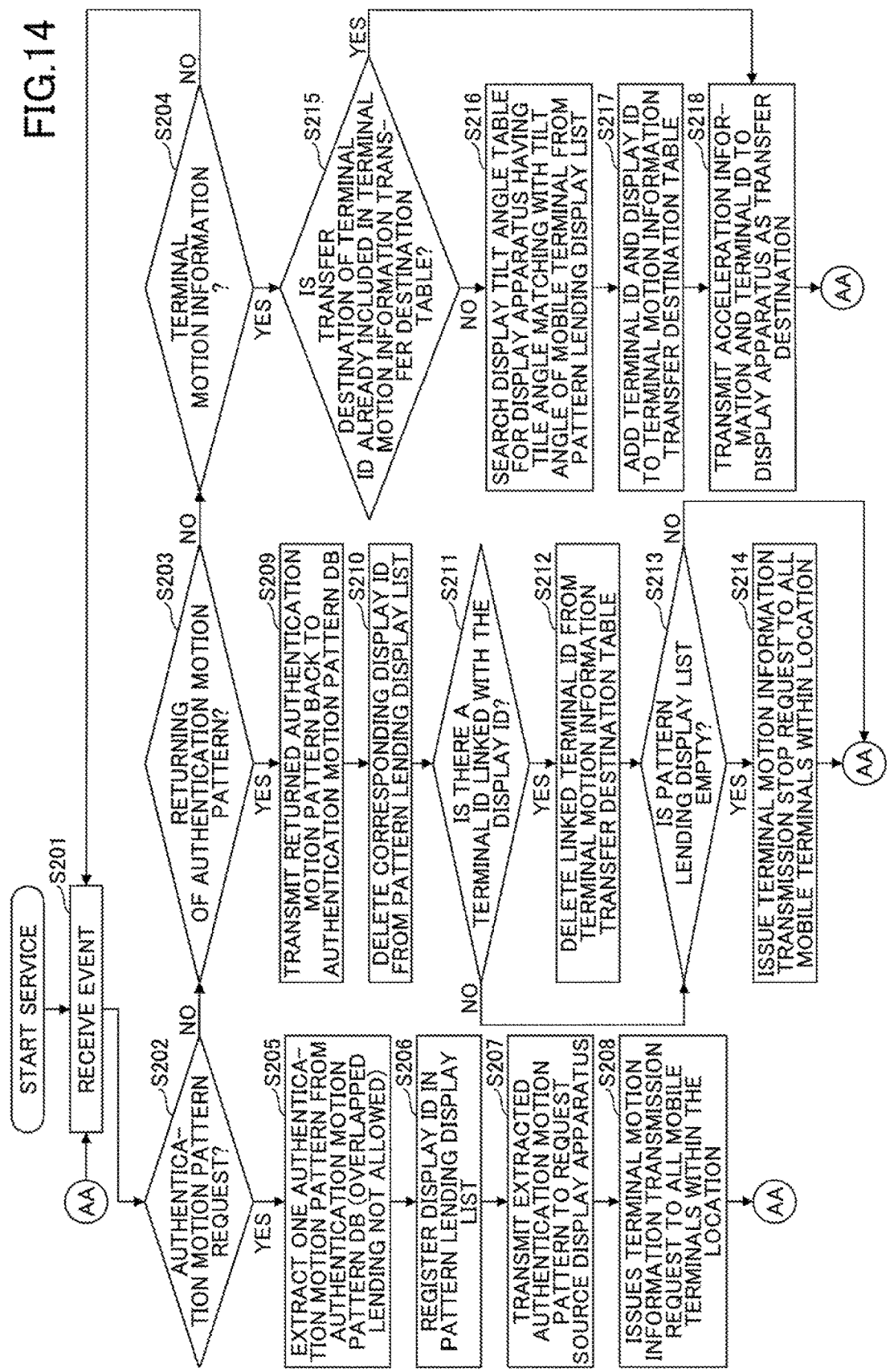
FIG. 14 is a flowchart illustrating a process example of a server apparatus.

FIG. 14 is a flowchart illustrating a process example of the server apparatus 1. In FIG. 14, when receiving an event from the outside (step S201), the server apparatus 1 determines whether the received event is one of an authentication motion pattern request (step S202), returning of the authentication motion pattern (step S203), and terminal motion information (step S204).

When the received event is the authentication motion pattern request (Yes in step S202), the authentication motion pattern manager 11 extracts one of the authentication motion patterns from the authentication motion pattern DB 13, and disables lending the authentication motion pattern redundantly (in an overlapped manner) (step S205). Subsequently, the authentication motion pattern manager 11 registers the display ID of the request source display apparatus 3 in the pattern lending display list 14 (step S206), and transmits the extracted authentication motion pattern to the request source splay apparatus 3 (Step S207). Subsequently, the authentication motion pattern manager 11 issues a terminal motion information transmission request to all mobile terminals 4 within the location (step S208). The process then returns to a standby mode for receiving an event (step S201).

When the received event is the return of the authentication motion pattern (Yes in step S203), the authentication motion pattern manager 11 transmits the returned authentication motion pattern back to the authentication motion pattern DB 13 (step S209). The authentication motion pattern manager 11 subsequently deletes the corresponding display ID from the pattern lending display list 14 (step S210). The authentication motion pattern manager 11 then determines whether there is a terminal ID linked with the display ID in the terminal motion information transfer destination table 15 (step S211). When there is a linked terminal ID (Yes in step S211), this linked terminal ID is deleted from the terminal motion information transfer destination table 15 (step S212). When there is no linked terminal ID (No in step S211), the deletion of the terminal ID from the terminal motion information transfer destination table 15 is not performed.

The authentication motion pattern manager 11 determines whether the pattern lending display list 14 includes no display ID of the display apparatus 3 (whether the pattern lending display list 14 is empty) (step S213). When the pattern lending display list 14 includes no display ID of the display apparatus 3 (Yes in step S213), the authentication motion pattern manager 11 issues the terminal motion information transmission stop request to all the mobile terminals 4 within the location (Step S214). When the pattern lending display list 14 includes any display ID of the display apparatus 3 (No in step S213), the authentication motion pattern manager 11 will not issue the terminal motion information transmission stop request. The process then returns to a standby mode for receiving an event (step S201).

When the received event is the terminal motion information (Yes in step S204), the terminal motion information transferor 12 determines whether the transfer destination of the terminal ID of the transmission source is already included in the terminal motion information transfer destination table 15 (step S215). When the transfer destination of the terminal ID of the transmission source is not included in the terminal motion information transfer destination table 15 (No in step S215), the terminal motion information transferor 12 searches the display tilt angle table 16 for the display apparatus 3 having the tilt angle matching with the tilt angle of the mobile terminal 4 among the display apparatuses 3 included in the pattern lending display list 14 (step S216). The terminal ID and the display ID are added to the terminal motion information transfer destination table 15 in accordance with the search result (step S217). When the transfer destination of the terminal ID of the transmission source is already included in the terminal motion information transfer destination table 15 (Yes in step S215), search by the tilt angle will not be performed and the terminal ID and the display ID obtained in accordance with the search result will not be added to the terminal motion information transfer destination table 15. The terminal motion information transferor 12 transmits the acceleration information of the terminal motion information and the terminal ID to the display apparatus 3 serving as the transfer destination (step S218). The process then returns to a standby mode for receiving an event (step S201).

Figure 15:
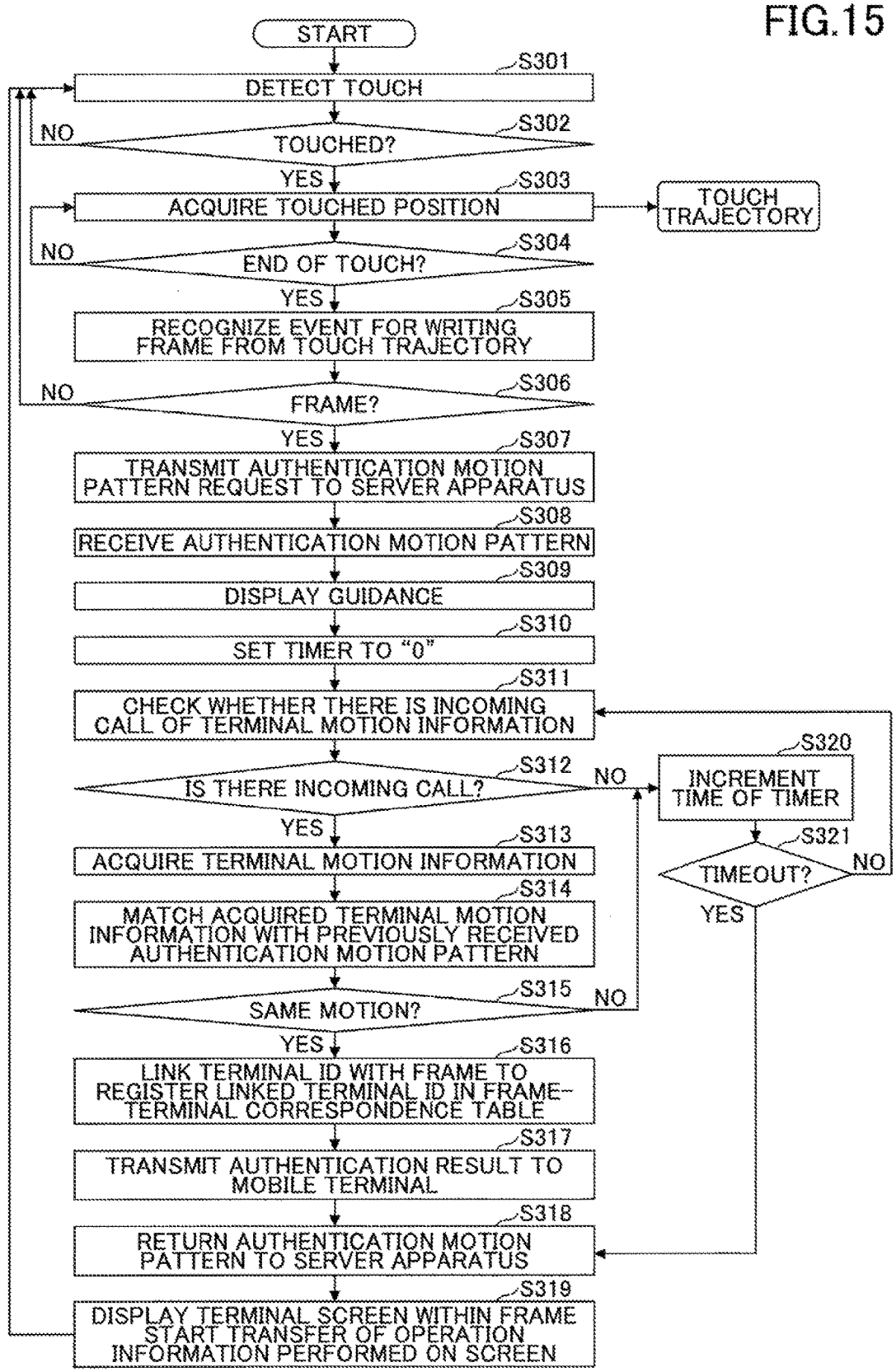
FIG. 15 is a flowchart illustrating a process example of a display apparatus.

FIG. 15 is a flowchart illustrating a process example of the display apparatus 3. In FIG. 15, the operation recognizer 302 of the display apparatus 3 performs touch detection (step S301). When the operation recognizer 302 has detected the touch (Yes in step S302), the operation recognizer 302 acquires a touched position to hold the acquired touched position as a touch trajectory (step S303). The operation recognizer 302 increments the touch trajectory until the operation recognizer 302 recognizes the end of the touch. When the operation recognizer 302 recognizes the end of the touch (Yes in step S304), the operation recognizer 302 recognizes an event for writing a frame from the touch trajectory (step S305). When the operation recognizer 302 recognizes the frame (Yes in step S306), the authentication motion pattern request transmitter 303 transmits an authentication motion pattern request to the server apparatus 1 (step S307).

Upon receiving the authentication motion pattern from the server apparatus 1 in response to the authentication motion pattern request (step S308), the authentication motion pattern receiver 305 displays guidance on the guidance display 307 based on guidance information included in the authentication motion pattern (step S309). The time of the internal timer is then set to "0" to start timekeeping (step S310). This timekeeping is used for determining whether the time is up in a case where authentication is incapable of being performed.

Subsequently, the terminal motion information receiver 309 checks whether the terminal motion information receiver 309 has received an incoming call of the terminal motion information from the server apparatus 1 (step S311), and when the terminal motion information receiver 309 has received the incoming call (Yes in step S312), the terminal motion information receiver 309 acquires the terminal motion information (step S313). The authentication processor 311 matches the acquired terminal motion information with the previously received authentication motion pattern (step S314). When the authentication processor 311 determines that the acquired terminal motion information matches the previously received authentication motion pattern as a result of the matching (Yes in step S315), the authentication processor 311 links the terminal ID with the frame (display area) to register the linked terminal ID in the frame-terminal correspondence table 312 (step S316). The authentication result transmitter 313 subsequently transmits the authentication result (display ID) to the corresponding mobile terminal 4 (step S317). The authentication motion pattern returning unit 314 returns the authentication motion pattern to the server apparatus 1 (step S318). The screen to be transmitted later from the mobile terminal 4 is displayed within a frame to which the screen is linked, transfer of the operation information performed on the screen to the mobile terminal 4 is started (step S319), and the process of detecting touch is processed again (step S301).

When the terminal motion information receiver 309 has not received an incoming call of the terminal motion information from the server apparatus 1 (No in step S312) or when the matching result indicates that the acquired terminal motion information does not match the previously received authentication motion pattern as a result of the matching (No in step S315), the time of the timer is incremented (step S320), and whether the timeout has occurred is determined (step S321). When the timeout has not occurred (No in step S321), the process of checking the incoming call is performed again (step S311). When the timeout has occurred (Yes in step S321), the process moves to the returning of the authentication motion pattern (step S318).

Figure 16:
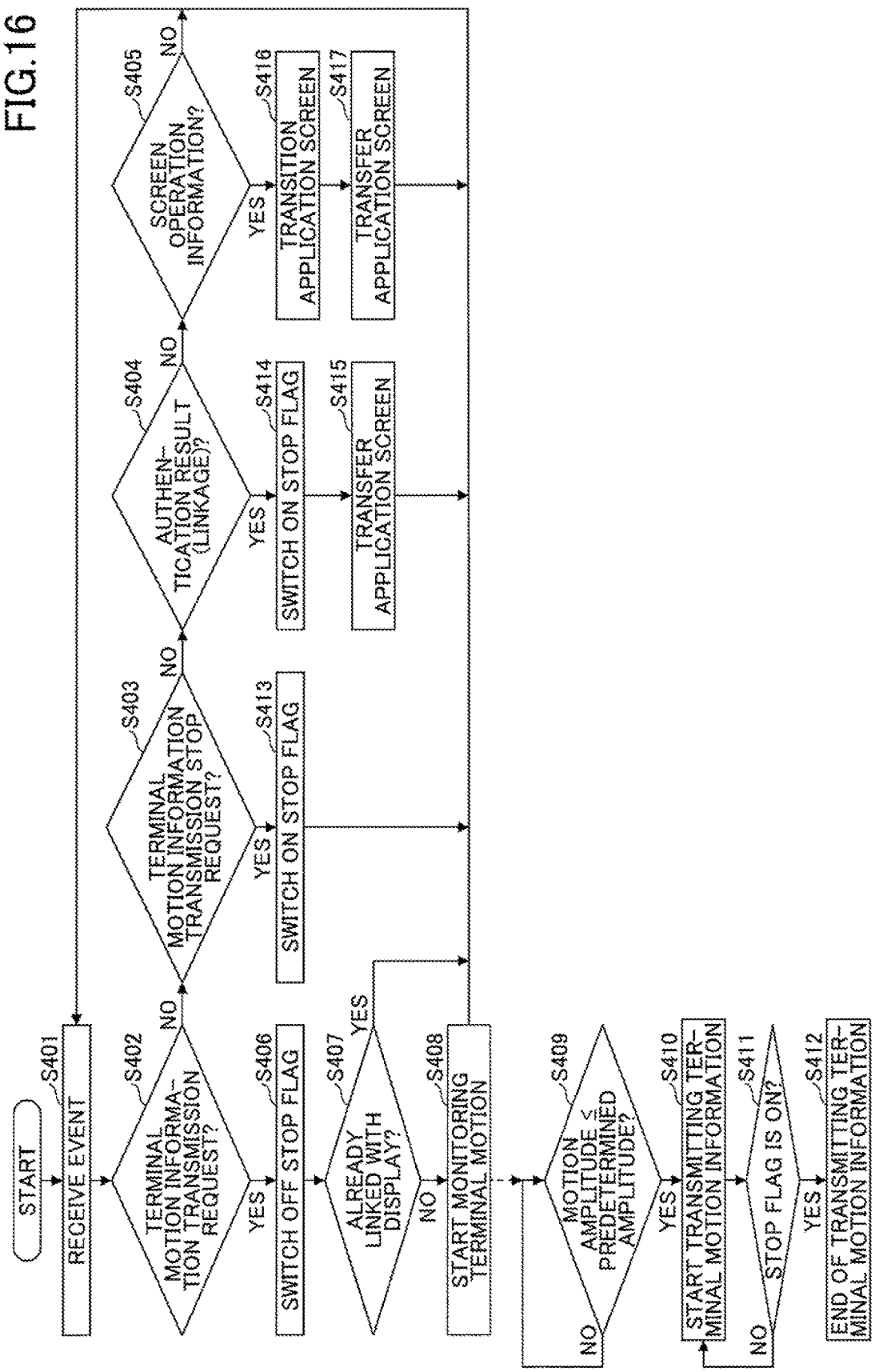
FIG. 16 is a flowchart illustrating a process example of a mobile terminal.

FIG. 16 is a flowchart illustrating a process example of the mobile terminal 4. In FIG. 16, when receiving an event from the outside (step S401), the mobile terminal 4 determines whether the received event is a terminal motion information transmission request, a terminal motion information transmission stop request, an authentication result (linkage), or screen operation information (steps S402 to S405).

When the received event is the terminal motion information transmission request (Yes in step S402), the terminal motion information transmitter 404 turns OFF the stop flag 405 (step S406). Subsequently, the terminal motion information transmitter 404 determines whether the screen of the mobile terminal 4 itself has already been linked with the display apparatus 3 (step S407). When the mobile terminal 4 itself has already been linked with the display apparatus 3 (Yes in step S407), the process then returns to a standby mode for receiving an event (step S401). When the mobile terminal 4 itself has not been linked with the display apparatus 3 (No in step S407), the terminal motion information transmitter 404 starts monitoring the motion of the mobile terminal 4 itself (step S408). The process then returns to a standby mode for receiving an event (step S401).

In the above started motion monitoring, the terminal motion information transmitter 404 determines whether the motion amplitude (the amplitude of the acceleration change) is equal to or greater than a predetermined value (step S409). When the motion amplitude is equal to or greater than a predetermined value (Yes in step S409), the terminal motion information transmitter 404 starts transmitting the terminal motion information (step S410). Subsequently, the terminal motion information transmitter 404 determines whether the stop flag 405 is switched ON (step S411). When the stop flag 405 is not switched ON (No in step S411), the terminal motion information transmitter 404 continues transmitting the terminal motion information (step S410). When the stop flag 405 is switched ON (Yes in step S411), the terminal motion information transmitter 404 ends the transmission of the terminal motion information (step S412).

When the received event is the terminal motion information transmission stop request (Yes in step S403), the terminal motion information transmitter 404 turns ON the stop flag 405 (step S413). The process then returns to a standby mode for receiving an event (step S401).

When the received event is the authentication result (linkage) (Yes in step S404), the terminal motion information transmitter 404 turns ON the stop flag 405 (step S414), and the screen transmitter 409 starts the transfer of the screen (step S415). The process then returns to a standby mode for receiving an event (step S401).

When the received event is the screen operation information (Yes in step S405), the screen linkage application 408 transitions the application screen (step S416) and the screen transmitter 409 transfers the screen (step S417). The process then returns to a standby mode for receiving an event (step S401).

Note that the illustration is given above of the case where the matching of the authentication motion pattern is performed by the display apparatus 3; however, the matching of the authentication motion pattern may be performed by the server apparatus 1.

Modification

In the embodiment described above, the mobile terminal 4 itself is moved in accordance with a predetermined pattern, and the embodiment may be applied to the mobile terminal 4 having an inertial sensor (acceleration sensor, gyroscope, etc.) such as a smartphone. However, the embodiment is not applicable to a mobile terminal 4 having no inertial sensor such as a PC (Personal Computer). Hence, the following illustrates modification of the embodiment that may be applied to a mobile terminal 4 having no inertial sensor. Note that the modification may be combined with the above-described embodiment.

Figure 17:
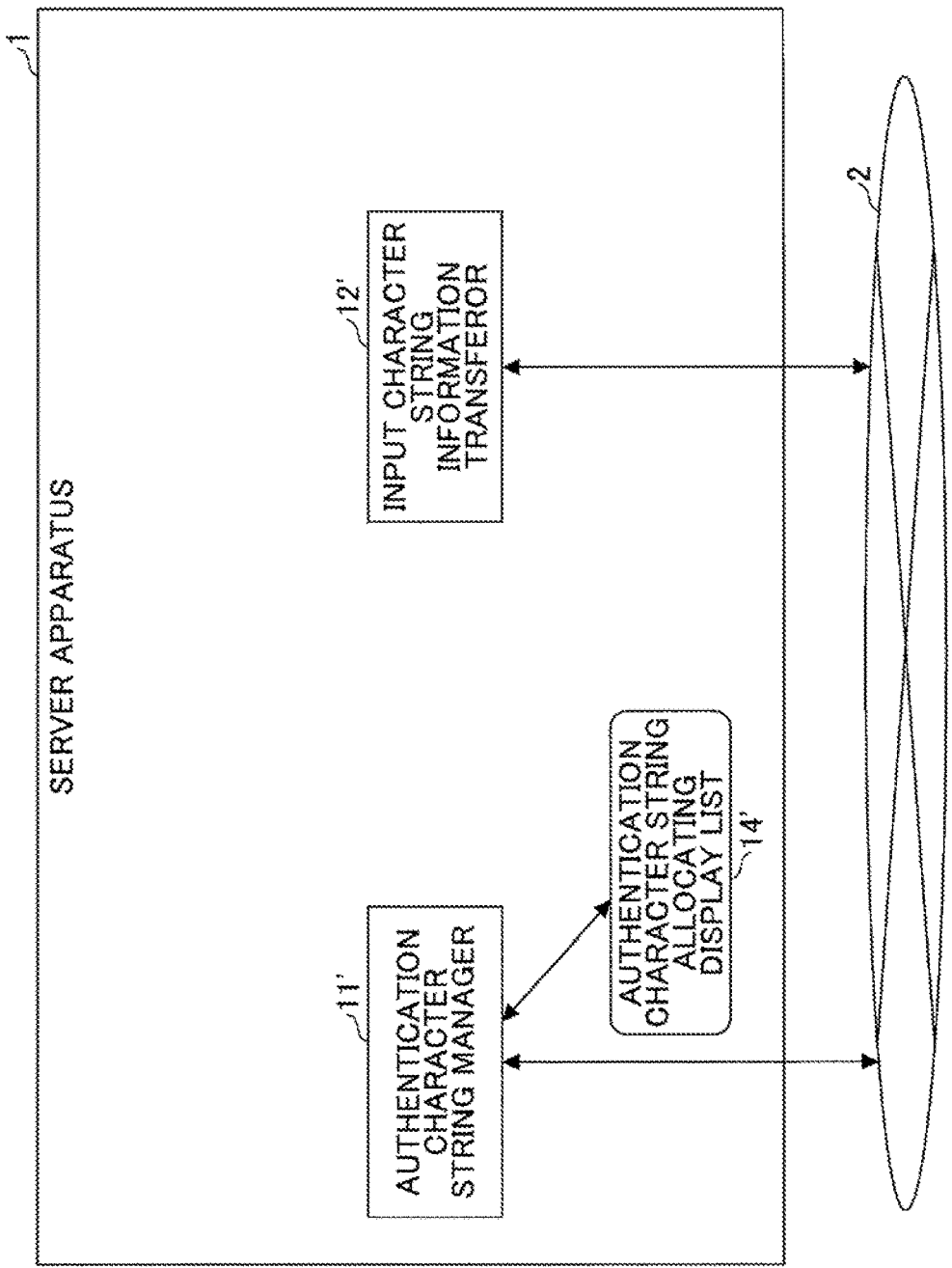
FIG. 17 is a diagram illustrating another functional configuration example of the server apparatus.

FIG. 17 is a diagram illustrating a functional configuration example of the server apparatus 1. In FIG. 17, the server apparatus 1 includes an authentication character string manager 11', an input character string information transferor 12', and an authentication character string allocating display list 14'.

When receiving an authentication character string acquisition request from any one of the display apparatuses 3 via the network 2, the authentication character string manager 11' has a function to issue an authentication character string that does not overlap the authentication character string currently being allocated and transmits the issued authentication character string to the request source display apparatus 3. The allocated authentication character string is managed such that the allocated authentication character string will not be allocated to another display apparatus redundantly (in an overlapped manner). The authentication character string manager 11' records, in the authentication character string allocating display list 14', the ID (display ID) of the display apparatus 3 that has allocated the authentication character string. The authentication character string allocating display list 14' may have a data structure similar to a data structure of the aforementioned pattern lending display list 14 (FIG. 8A), or may hold the authentication character string that has been allocated in association with the display ID. Note that in a case where the authentication character string manager 11' has allocated the authentication character string, the authentication character string manager 11' transmits a transmission request of input character string information to all the mobile terminals 4 being present in a predetermined location (a predetermined range in which the multiple display apparatuses 3 may be used). The input character string information is character string information input by a user who has seen the authentication character string.

The authentication character string manager 11' has a function to perform a process of returning an authentication character string when receiving a return request of the authentication character string from the display apparatus 3. That is, the authentication character string manager 11' deletes, from the authentication character string allocating display list 14', the ID (display ID) of the display apparatus 3 that has returned the authentication character string, and resets the authentication character string to be in a state of not being allocated. Further, in a case where there is no remaining authentication character string currently being allocated, the authentication character string manager 11' transmits a transmission stop request of the input character string information to all mobile terminals 4 being present in the predetermined location.

The input character string information transferor 12' has a function to transfer the input character string information to the display apparatus 3 with the terminal ID when receiving the input character string information from the mobile terminal 4.

Figure 18:
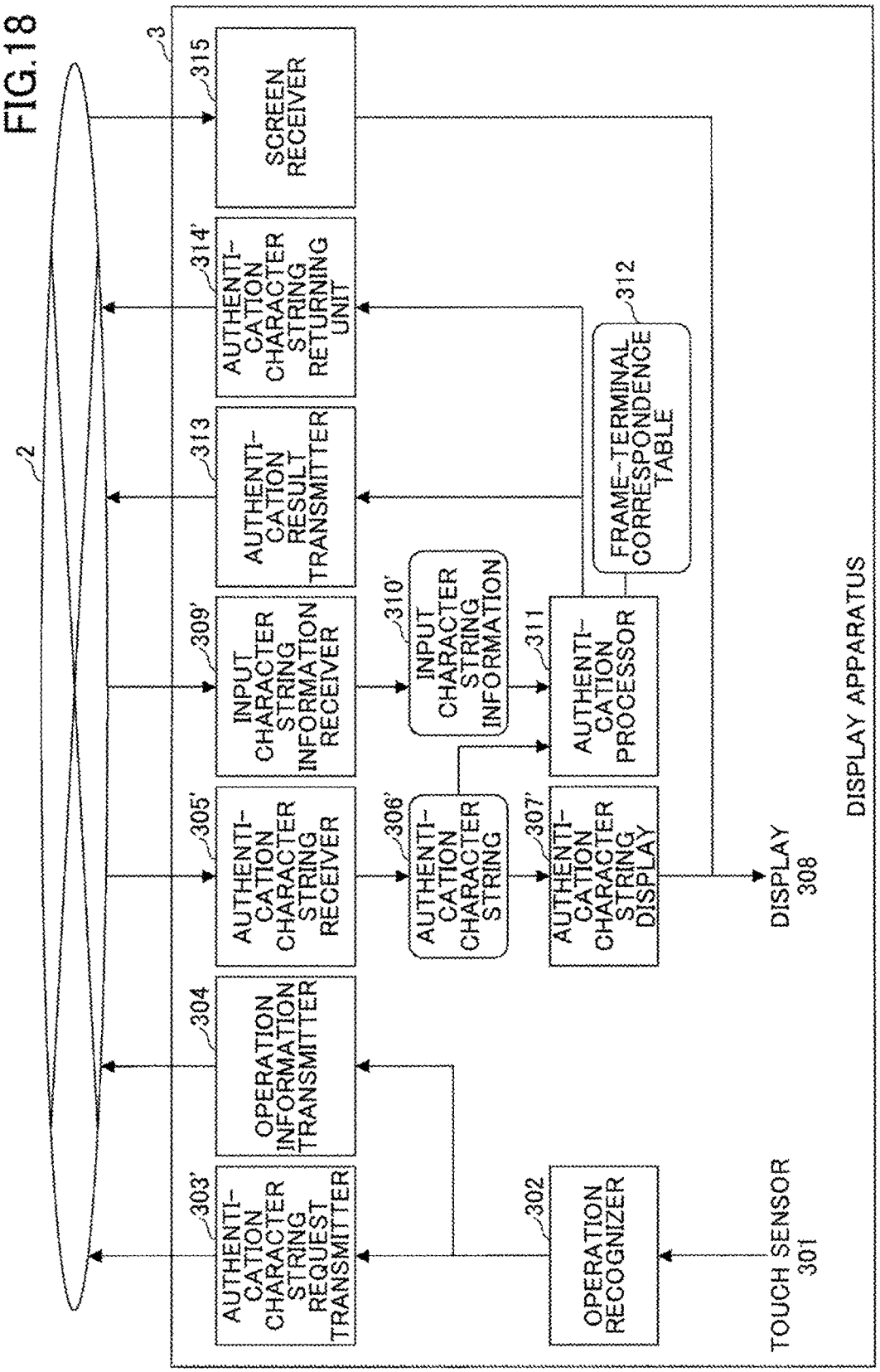
FIG. 18 is a diagram illustrating another functional configuration example of the display apparatus.

FIG. 18 is a diagram illustrating a functional configuration example of the display apparatus 3. In FIG. 18, the display apparatus 3 includes the operation recognizer 302, an authentication character string request transmitter 303', and the operation information transmitter 304. The display apparatus 3 further includes an authentication character string receiver 305', an authentication character string display 307', an input character string information receiver 309', the authentication processor 311, the authentication result transmitter 313, an authentication character string return unit 314', and the screen receiver 315.

The operation recognizer 302 includes a function to recognize an operation based on coordinates of a contact position of a user's finger, a pen, or the like on the screen by the touch sensor 301 disposed on the front surface of the display 308. For example, when a rectangular frame is drawn, the operation recognizer 302 recognizes a frame drawing operation. Note that it may be possible to use another mechanism to obtain the coordinates of the contact position by the user's finger or the pen on the screen instead of the touch sensor 301. The authentication character string request transmitter 303' has a function to transmit an authentication character string request to the server apparatus 1 when the operation recognizes 302 recognizes (detects) the frame drawing operation.

The authentication character string receiver 305' has a function to receive the authentication character string from the server apparatus 1 to hold the received authentication character string as an authentication character string 306'. The authentication character string display unit 307' has a function to display an authentication character string on the display screen of the display 308, for example, within the recognized and formatted frame or adjacent to the frame, on the basis of the authentication character string 306'.

The input character string information receiver 309' has a function to receive input character string information from the mobile terminal 4 transferred from the server apparatus 1 to hold the received input character string information as input character string information 310'. The authentication processor 311 has a function to match the authentication character string 306' with the input character string information 310' and to determine whether the authentication character string 306' and the input character string information 310' are the same. When the authentication processor 311 determines that the authentication character string 306' matches the input character string information 310', the authentication processor 311 registers a frame (frame ID, XY coordinates) in association with the terminal ID in the frame-terminal correspondence table 312. The authentication result transmitter 313 has a function to transmit the display ID to the corresponding mobile terminal 4 as an authentication result indicating that the authentication has been performed by the authentication processor 311.

The authentication character string returning unit 314' has a function to return to the server apparatus 1 the authentication character string that has been authenticated by the authentication processor 311 or the authentication character string that has not been authenticated due to time-up. The authentication character string may be specified for requesting the returning of the authentication character string.

The screen receiver 315 has a function to receive an application screen from the mobile terminal 4 that has been linked to display the received application screen on the display 308. The operation information transmitter 304 has a function to transmit, to the mobile terminal 4, the operation (enlargement; reduction, movement, page feed/return, point, etc., of the screen) of the application screen within the frame recognized by the operation recognizer 302. The mobile terminal 4 that has received the operation information performs screen transition according to the operation information and transmits an update screen. The transmitted update screen is then received by the screen receiver 315 to thereby perform screen update of the display 308.

Figure 19:
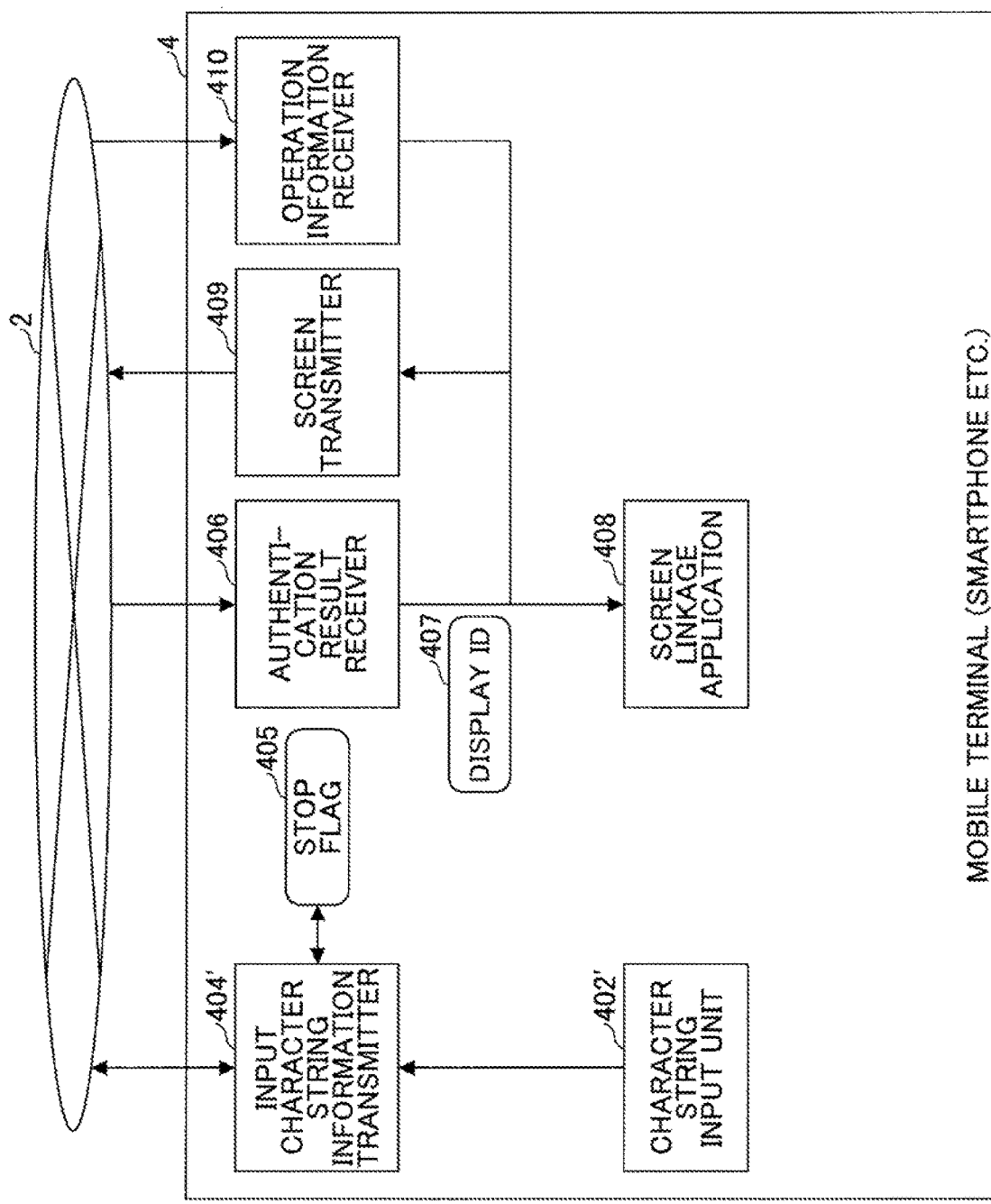
FIG. 19 is a diagram illustrating another functional configuration of the mobile terminal.

FIG. 19 is a diagram illustrating an example of a functional configuration of the mobile terminal 4. In FIG. 19, the mobile terminal 4 includes a character string input unit 402', an input character string information transmitter 404', the authentication result receiver 406, the screen linkage application 408, the screen transmitter 409, and the operation information receiver 410.

The character string input unit 402' has a function to input a character string from a user. The input character string information transmitter 404' has a function to transmit, to the server apparatus 1, the character string information input by the character string input unit 402'. Note that the terminal motion information transmitter 404 has the stop flag 405, and the terminal motion information transmitter 404' operates only when the stop flag 405 is switched OFF. The stop flag 405 is switched OFF when an input character string information transmission request is transmitted from the server apparatus 1. When a character string information stop request is transmitted from the server apparatus 1 or when an authentication result that the linking has completed is obtained from the display apparatus 3, the stop flag 405 is switched ON.

The authentication result receiver 406 has a function to receive, from the display apparatus 3, the authentication result that has been linked to hold the display ID included in the received authentication result as the display ID 407. The screen linkage application 408 is a process entity of an application program for providing a screen to be displayed on the display apparatus 3. The screen transmitter 409 has a function to transmit a screen of the screen linkage application 408 to the linked display apparatus 3. The operation information receiver 410 has a function to receive operation information with respect to the screen from the display apparatus 3 to transfer the received operation information to the screen linkage application 408.

Figure 20:
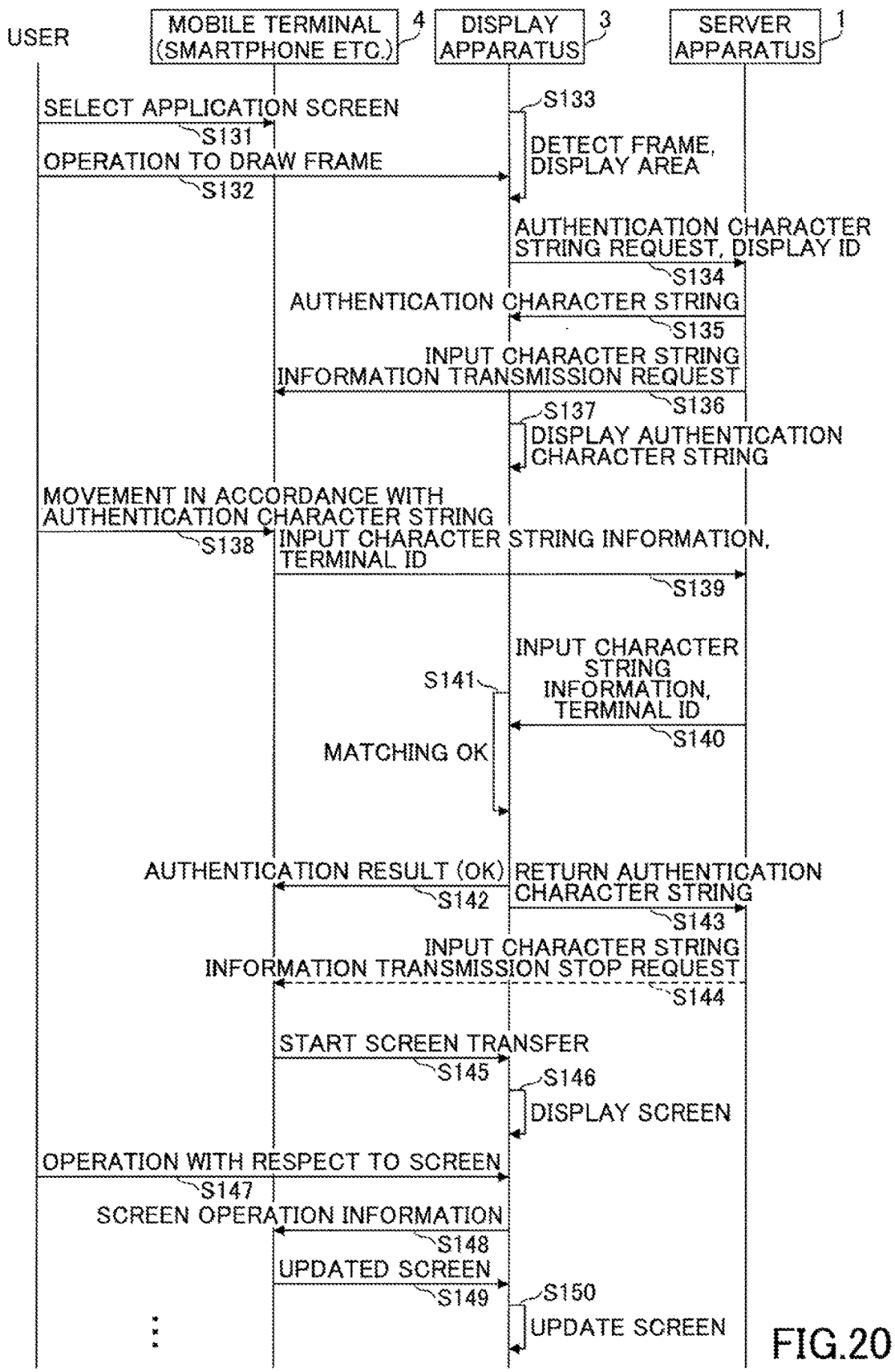
FIG. 20 is a sequence diagram illustrating another process example according to the embodiment.
Figure 21A:
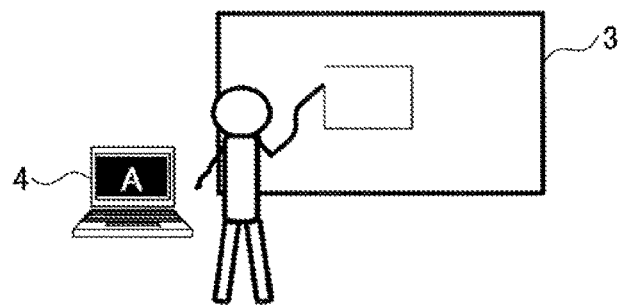
FIGS. 21A to 21E are diagrams illustrating operation examples and display examples.

FIG. 20 is a sequence diagram illustrating a processing example of the embodiment. In FIG. 20, a user of the mobile terminal 4 selects a screen desired to be displayed on the display apparatus 3 from the screen linkage application 408 of the mobile terminal 4 (step S131), and traces a frame corresponding to a display area with a finger, a pen, and the like on the screen of the desired display apparatus 3 to draw the frame (step S132). FIG. 21A illustrates a state in which the screen "A" is displayed on the mobile terminal 4 and the user draws a rectangular frame on the display apparatus 3.

Figure 21B:
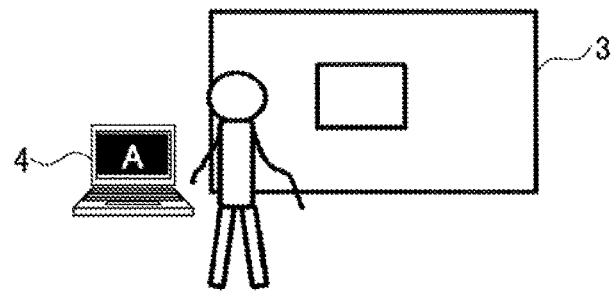

Referring back to FIG. 20, when the operation recognizer 302 of the display apparatus 3 detects that a frame has been drawn, the operation recognizer 302 displays the display area that has been formatted on the screen (step S133). FIG. 21B illustrates a state in which the display area is displayed on the screen of the display apparatus 3.

Referring back to FIG. 20, the authentication character string request transmitter 303' of the display apparatus 3 transmits an authentication character string request to the server apparatus 1 with the display ID of the display apparatus 3 itself (step S134). In response to the authentication character string request, the authentication character string manager 11' of the server apparatus 1 sequentially or randomly issues an authentication character string that does not overlap the authentication character string currently being allocated, and transmits the issued authentication character string to the request source display apparatus 3 (step S135). For example, the authentication character string manager 11' issues an authentication character string "67" to transmit the issued authentication character string "67" to the display apparatus 3. In addition, the authentication character string manager 11' also transmits an input character string information transmission request to all the mobile terminals 4 being present within a predetermined location. (a predetermined range in which multiple display apparatuses 3 may be used) (step S136). Upon receiving the input character string information transmission request, the mobile terminal 4 displays a character string input field on the screen.

Figure 21C:
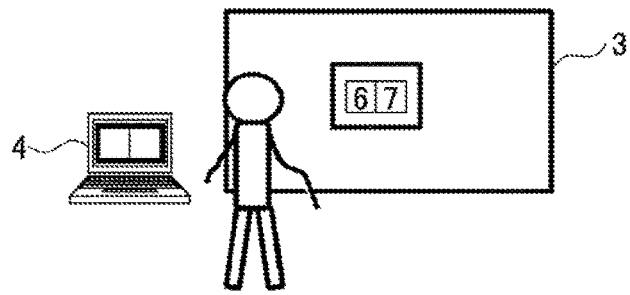

The display apparatus 3 displays an authentication character string on the authentication character string display 307' based on the authentication character string received by the authentication character string receiver 305' (step S137). FIG. 21C illustrates a state in which the authentication character string "67" is displayed in a display area of the display apparatus 3 and the character string input field is displayed on the screen of the mobile terminal 4.

Figure 21D:
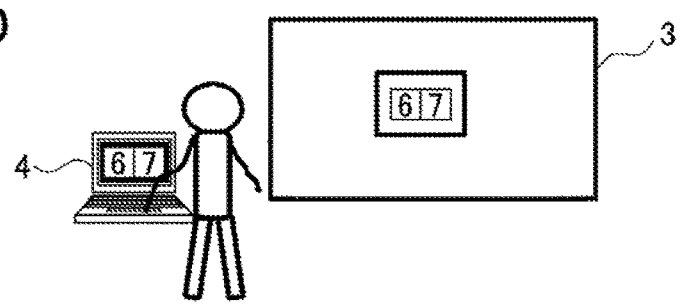

Referring back to FIG. 20, the user of the mobile terminal 4 inputs the same character string in the input field of the mobile terminal 4 according to the authentication character string displayed on the display apparatus 3 (step S138). The character string input section 402' inputs a character string, and the input character string information transmitter 404' transmits the input character string information to the server apparatus 1 together with the terminal ID of the mobile terminal itself (step S139). FIG. 21D illustrates a state in which the user has input the character string "67" in the input field of the mobile terminal 4.

Referring back to FIG. 20, the input character string information transferor 12' of the server apparatus 1 transfers the input character string information received from the mobile terminal 4 to the display apparatus 3 together with the terminal ID (step S140).

When the input character string information receiver 309' of the display apparatus 3 receives the input character string information and the terminal ID, the authentication processor 311 matches the received input character string information with the previously obtained authentication character string (step S141). In this case, when the authentication processor 311 determines that the received input character string information matches the previously obtained authentication character string, the authentication result transmitter 313 transmits the display ID to the mobile terminal 4 as an authentication result indicating that the authentication has been successful (step S142). The authentication character string returning unit 314' returns the authentication character string to the server apparatus 1 together with the authentication character string (step S143). That is, the authentication character string manager 11' of the server apparatus 1 deletes, from the authentication character string allocating display list 14', the ID (display ID) of the display apparatus 3 that has returned the authentication character string, and resets the authentication character string to be in a state of not being allocated. In addition, when all the authentication character strings being allocated have been returned and there are no remaining authentication character strings, the authentication character string manager 11' transmits an input character string information transmission stop request to all mobile terminals 4 being present in a predetermined location (step S144).

Figure 21E:
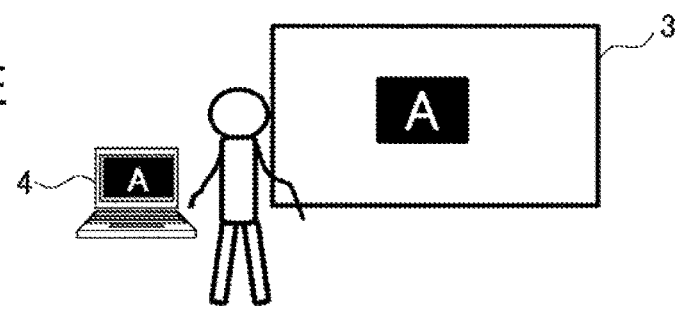

The mobile terminal 4 that has received the authentication result indicating that the authentication has been successful from the authentication result receiver 406 starts transferring, by the screen transmitter 409, the screen of the screen linkage application 408 to the display apparatus 3 to which the mobile terminal 4 is linked (step S145). Note that it is assumed that the transfer of the screen maybe voluntarily started by the mobile terminal 4 in this embodiment; however, the transfer of the screen may be requested by the display apparatus 3 such that the mobile terminal 4 may start transferring the screen in response to the request. Upon receiving the screen, the screen receiver 315 of the display apparatus 3 displays the received screen on the display 308 (step S146). FIG. 21E illustrates a state in which the screen "A" of the mobile terminal 4 is displayed in the display area of the display apparatus 3.

Referring back to FIG. 20, when any one of users subsequently performs an operation with respect to the area where the screen of the display apparatus 3 is displayed (step S147), the operation recognizer 302 of the display apparatus 3 recognizes the operation. The operation information transmitter 304 then transmits operation information to the corresponding mobile terminal 4 (step S148). When the operation information receiver 410 of the mobile terminal 4 receives the operation information, the screen linkage application 408 updates the screen according to the content of the operation, and the screen transmitter 409 transmits the updated screen to the display apparatus 3 (step S149). Upon receiving the updated screen, the screen receiver 315 of the display apparatus 3 displays the received updated screen on the display 308 (screen updated) (step S150).

The following illustrates detailed operations of the server apparatus 1, the display apparatus 3 and the mobile terminal 4.

FIG. 22 is a flowchart illustrating a process example of the server apparatus 1. In FIG. 22, when receiving an event from the outside (step S221), the server apparatus 1 determines whether the received event is one of an authentication character string request (step S222), returning of the authentication character string (step S223), and input character string information (Step S224).

When the received event is the authentication character string request (Yes in step S222), the authentication character string manager 11' sequentially or randomly issues an authentication character string that does not currently overlap the authentication character string currently being allocated, and internally holds the issued authentication character string (step S225). Subsequently, the authentication character string manager 11' registers the requested display ID of the display apparatus 3 in the authentication character string allocating display list 14' (step S226), and transmits the issued authentication character string to the request source display apparatus 3 (Step S227). Subsequently, the authentication character string manager 11' issues an input character string information transmission request to all mobile terminals 4 within the location (step S228). The process then returns to a standby mode for receiving an event (step S221).

When the received event is returning of the authentication character string (Yes in step S223), the authentication character string manager 11' sets the returned authentication character string in a state of not being allocated, and deletes, from the authentication character string allocating display list 14', the corresponding display ID (step S229). Subsequently, the authentication character string manager 11' determines whether the authentication character string allocating display list 14' includes no authentication character string (whether the authentication character string allocating display list 14' is empty) (step S230). When the authentication character string allocating display list 14' includes no authentication character string (Yes in step S230), the authentication character string manager 11' issues an input character string information transmission stop request to all the mobile terminals 4 within the location (step S231). When the authentication character string allocating display list 14' includes any authentication character string (No in step S230), the authentication character string manager 11' will not issue the input character string information transmission stop request. The process then returns to a standby mode for receiving an event (step S221).

When the received event is input character string information (Yes in step S224), the input character string information transferor 12' transmits the input character string information and the terminal ID to the display apparatus 3 listed on the authentication character string allocating display list 14' (step S232). The process then returns to a standby mode for receiving an event (step S221).

Figure 23:
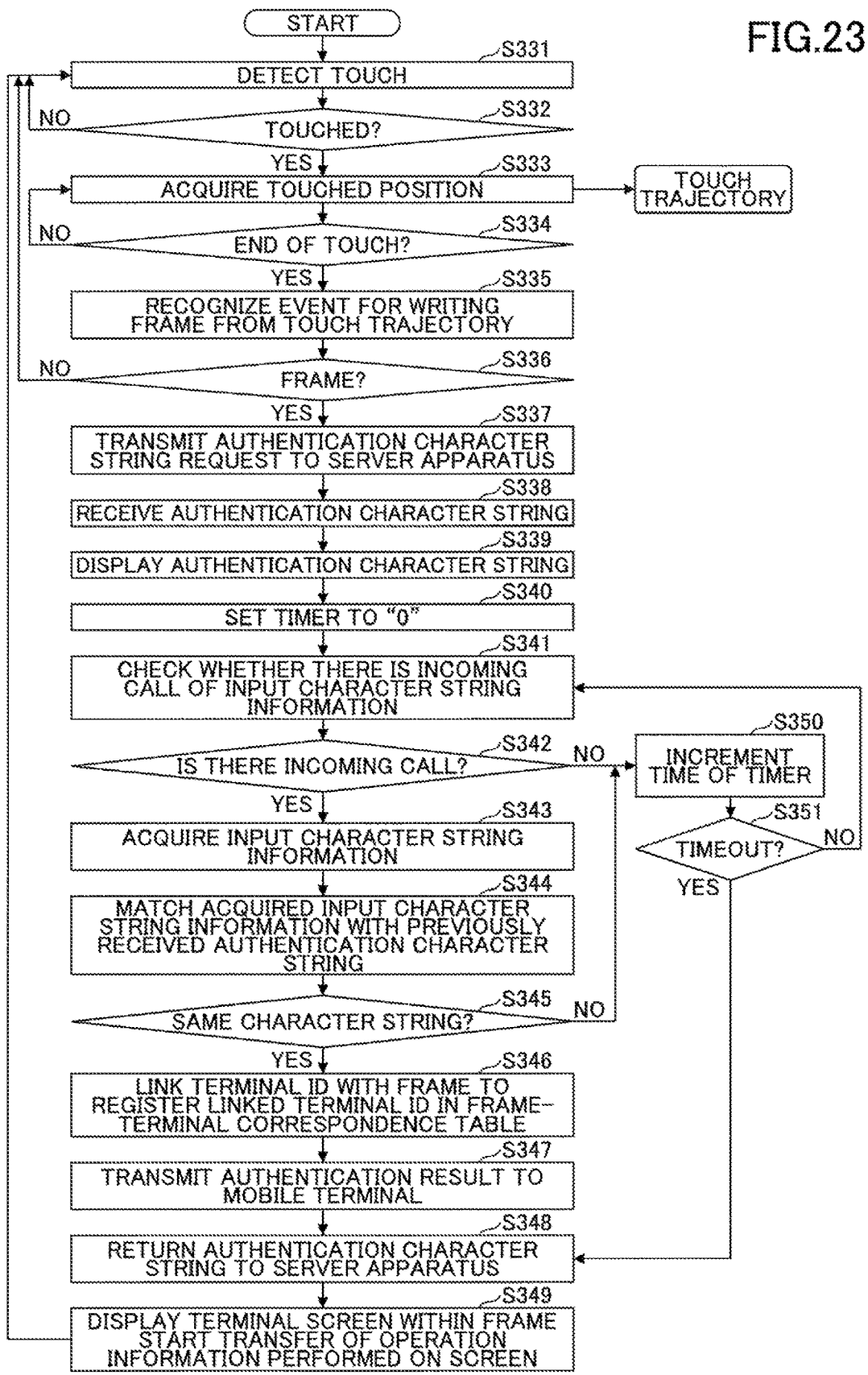
FIG. 23 is a flowchart illustrating another process example of the display apparatus.

FIG. 23 is a flowchart illustrating a process example of the display apparatus 3. In FIG. 23, the operation recognizer 302 of the display apparatus 3 performs touch detection (step S331). When the operation recognizer 331 has detected a touch (Yes in step S332), the operation recognizer 332 acquires a touched position to hold the acquired touched position as a touch trace (step S333). The operation recognizer 302 increments the touch trace until the operation recognizer 302 recognizes the end of the touch. When the operation recognizer 302 recognizes the end of the touch (Yes in step S334), the operation recognizer 335 recognizes a frame writing event from the touch trajectory (step S335). When the operation recognizer 335 recognizes the frame (Yes in step S336), the authentication character string request transmitter 303' transmits an authentication character string request to the server apparatus 1 (step S337).

Upon receiving, from the server apparatus 1, the authentication character string in response to the authentication character string request (step S338), the authentication character string receiver 305' displays the authentication character string within the frame or in the vicinity of the frame (step S339). The time of the internal timer is then set to "0" to start timekeeping (step S340). This timekeeping is used for determining whether the time is up in a case where authentication is incapable of being performed.

Subsequently, the input character string information receiver 309' checks whether the input character string information receiver 309' has received an incoming call of the input character string information from the server apparatus 1 (step S341), and when the input character string information receiver 309' has received the incoming call (Yes in step S342), the input character string information receiver 309' acquires the input character string information (step S343). The authentication processor 311 matches the acquired input character string information with the previously received input character string (step S344). When the authentication processor 311 determines that the acquired input character string information matches the previously received input character string as a result of the matching (Yes in step S345), the authentication processor 311 links the terminal ID with the frame (display area) to register the linked terminal ID in the frame-terminal correspondence table 312 (step S346). The authentication result transmitter 313 subsequently transmits the authentication result (display ID) to the corresponding mobile terminal 4 (step S347). Subsequently, the authentication character string returning unit 314' returns the authentication character string to the server apparatus 1 (step S348). The screen to be transmitted later from the mobile terminal 4 is displayed within a frame to which the screen is linked, transfer of the operation information performed on the screen to the mobile terminal 4 is started (step S349), and the process then returns to touch detection (step S331).

When the input character string information receiver 309' has not received an incoming call of the input character string information from the server apparatus 1 (No in step S342), or when the authentication processor 311 determines that the acquired input character string information does not match the previously received input character string as a result of the matching (No in step S345), the timer is incremented (step S350), and whether the timeout has occurred is determined (step S351). When the timeout has not occurred (No in step S351), the process of checking the incoming call is performed again (step S341). When the timeout has occurred (Yes in step S351) the process moves to the returning of the input character string (step S348).

Figure 24:
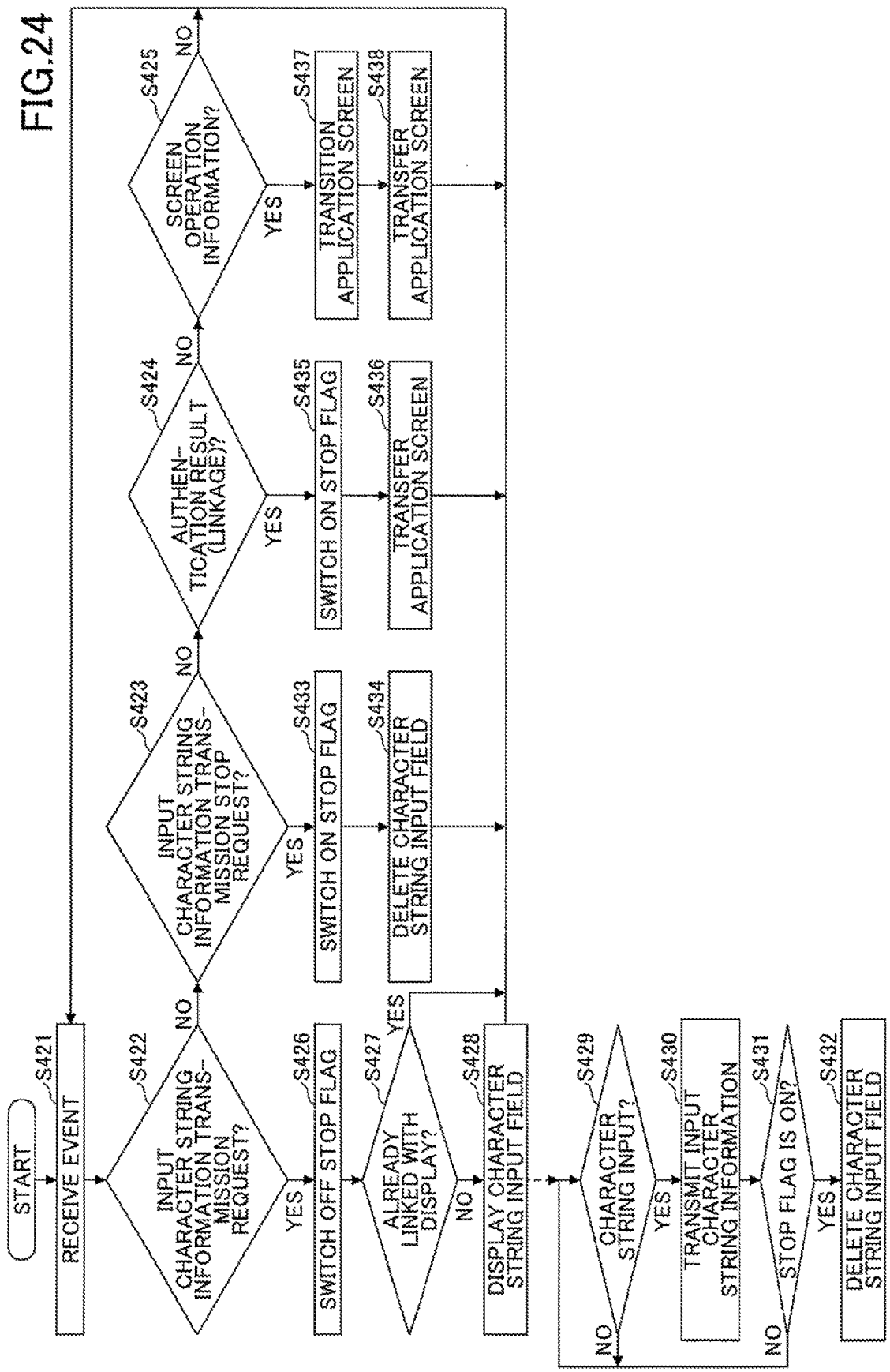
FIG. 24 is a flowchart illustrating another process example of the mobile terminal.

FIG. 24 is a flowchart illustrating a process example of the mobile terminal 4. In FIG. 24, when receiving an event from the outside (step S421), the mobile terminal 4 determines whether the received event is an input character string information transmission request, a terminal motion information transmission cancellation request, an authentication result (linkage), or screen operation information (steps S422 to S425).

When the received event is the input character string information transmission request (Yes in step S422), the input character string information transmitter 404' turns OFF the stop flag 405 (step S426). Subsequently, the input character string information transmitter 404' determines whether the screen of the mobile terminal 4 itself has already been linked with the display apparatus 3 (step S427). When the mobile terminal 4 itself has already been linked with the display apparatus 3 (Yes in step S427), the process then returns to a standby mode for receiving an event (step S421). When the mobile terminal 4 itself has not been linked with the display apparatus 3 (No in step S427), the input character string information transmitter 404' displays an input field of a character string (step S428). The process then returns to a standby mode for receiving an event (step S421). Note that, when one mobile terminal 4 allows each of a plurality of applications to associate with a frame on the display apparatus 3, it is not necessary to check whether the mobile terminal 4 itself has been linked with the display apparatus 3.

After displaying an input field of the character string, the input character string information transmitter 404' determines whether a character string that has been input in the input field is finalized (step S429). When the input character string information transmitter 404' determines that the character string input in the input field finalized (Yes in step S429), the input character string information transmitter 404' transmits input character string information (step S430). Subsequently, the input character string information transmitter 404' determines whether the stop flag 405 is turned ON (step S431). When the stop flag 405 is not turned ON (No in step S431), the input character string information transmitter 404' stands ready to receive an input of the character string (step S429). When the stop flag 405 is turned ON (Yes in step S431), the input character string information transmitter 404' stops displaying the input field of the character string (step S432).

When the received event is the input character string information transmission stop request (Yes step S423), the input character string information transmitter 404' turns ON the stop flag 405 (step S433) and stops displaying the input field of the character string (step S434). The process then returns to a standby mode for receiving an event (step S421).

When the received event is the authentication result (linkage) (Yes in step S424), the input character string information transmitter 404' turns ON the stop flag 405 (step S435), and the screen transmitter 409 starts the transfer of the screen (step S436). The process then returns to a standby mode for receiving an event (step S421).

When the received event is screen operation information (Yes in step S425), the screen linkage application 408 transitions to an application screen (step S437) and the screen transmitter 409 transfers the screen (step S438). The process then returns to a standby mode for receiving an event (step S421).

Note that the illustration is given above of the case where the matching of the authentication character string is performed by the display apparatus 3; however, the authentication character string may be performed by the server apparatus 1.

Figure 25:
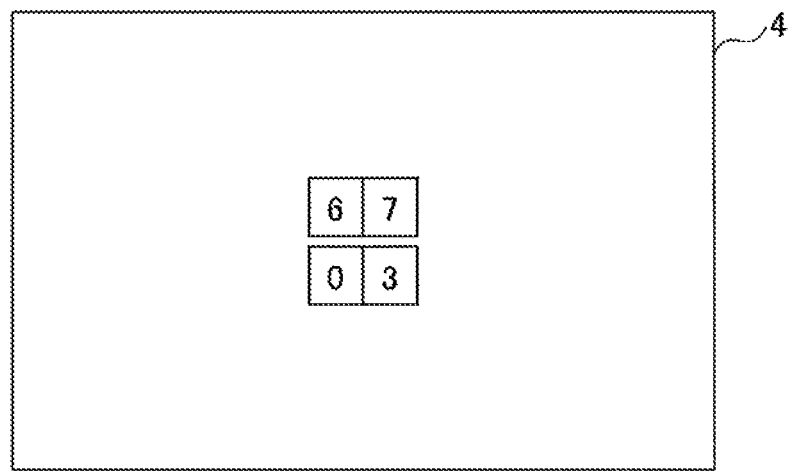
FIG. 25 is a diagram illustrating another example of input of character strings to a mobile terminal.

Further, the embodiment given above is based on the example where the authentication character string is displayed on the display apparatus 3 and the character string corresponding to the authentication character string is input from the mobile terminal 4; however, the embodiment is not limited to this example. The application ID for specifying an application may be input at the same time as inputting the authentication character string. FIG. 25 is a diagram illustrating an example of inputting of a character string to the mobile terminal 4. More specifically, FIG. 25 illustrates a state in which a character string "67" corresponding to an authentication character string of the frame and the application ID "03" of the application have been input for being displayed within the frame. When the mobile terminal 4 is a PC or the like, windows of multiple applications may be displayed on the screen. In such a case, a window of which application is to be displayed on the display apparatus 3 needs to be selected. However, the selection of a window may be facilitated by allowing a user to input the application ID simultaneously with the authentication character string.

In this case, the input character string information transferor 12' (FIG. 17), the input character string information receiver 309' (FIG. 18), the character string input unit 402', and the input character string information transmitter 404' may have an expanded function to handle not only the character string corresponding to the authentication character string but also the application ID. The frame-terminal correspondence table 312 (see FIG. 18) may also have an expanded function to associate the frames with the terminals and the applications.

Outline

One aspect of disclosed embodiments is to display a content on a display apparatus desired by a user.

The disclosed embodiments may provide a technology enabled to display a content on a display apparatus desired by a user.

ADVANTAGEOUS EFFECT

The disclosed embodiments may provide a technology capable of displaying content on a display apparatus desired by a user.

The preferred embodiments are described above. The embodiments of the present invention are illustrated with specific examples; however, the present invention is not limited to these examples, and various alterations or changes may be made without departing from the gist and the scope of the claims of the present invention. Specifically, the present invention shall not be construed as being limited to details of the specific examples and accompanying drawings thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A server apparatus for providing authentication information to associate a client terminal with a plurality of display apparatuses capable of displaying a content distributed from the client terminal, the server apparatus comprising:
   a storage configured to store a plurality of sets of authentication pattern information associated with information relating to operations of the client terminal; and
   an issuing unit configured to issue a set of authentication pattern information from among the plurality of sets of authentication pattern information stored in the storage to a display apparatus on which an operation has been performed by a user, among the plurality of display apparatuses, the set of authentication pattern information being issued to the display apparatus in response to a request from the display apparatus for authentication pattern information, the issuing unit being further configured to disable issuing the set of authentication pattern information issued to the display apparatus to a further display apparatus in a period from issuing the set of authentication pattern information to receiving return of the set of authentication pattern information from the display apparatus.

2. The server apparatus according to claim 1, wherein the issuing unit issues the authentication pattern information to the display apparatus on which an operation of specifying an area for displaying the content has been performed by the user.

3. The server apparatus according to claim 1, further comprising:
   a transferor configured to receive, from the client terminal, operation pattern information indicating motion of the client terminal itself, and transfer, based on information on a tilt angle of the client terminal, the operation pattern information to a display apparatus having the same tilt angle as the tilt angle of the client terminal.

4. The server apparatus according to claim 1, wherein the authentication pattern information further includes guidance information for guiding an operation pattern.

5. A content display control system comprising:
   a plurality of display apparatuses capable of displaying a content distributed from a client terminal; and
   a server apparatus for providing authentication information to associate the client terminal with the plurality of display apparatuses, wherein
   the server apparatus includes
      a storage configured to store a plurality of sets of authentication pattern information associated with information relating to operations of the client terminal, and
      an issuing unit configured to issue a set of authentication pattern information from among the plurality of sets of the authentication pattern information stored in the storage to a display apparatus on which an operation has been performed by a user, among the plurality of display apparatuses, the set of authentication pattern information being issued to the display apparatus in response to a request from the display apparatus for authentication pattern information, the issuing unit being further configured to disable issuing the set of authentication pattern information issued to the display apparatus to a further display apparatus in a period from issuing the set of authentication pattern information to receiving return of the set of authentication pattern information from the display apparatus; and
   the display apparatus includes
      a receiver configured to receive, from the server apparatus, operation pattern information and the authentication pattern information of the client terminal, and
      a display controller configured to display a content distributed from the client terminal that has output an operation pattern corresponding to the authentication pattern information, based on the authentication pattern information received by the receiver, and to return, to the server apparatus, the set of the authentication pattern information received by the receiver.

6. The content display control system according to claim 5, wherein
   the issuing unit issues the authentication pattern information to the display apparatus on which an operation of specifying an area for displaying the content has been performed by the user.

7. The content display control system according to claim 5, wherein
   the server apparatus further includes
   a transferor configured to receive, from the client terminal, operation pattern information indicating motion of the client terminal itself, and transfer, based on information on a tilt angle of the client terminal, the operation pattern information to a display apparatus having the same tilt angle as the tilt angle of the client terminal.

8. The content display control system according to claim 5, wherein
   the authentication pattern information further includes guidance information for guiding an operation pattern.

9. A non-transitory computer-readable storage medium storing a content display control program for controlling a content display control system, the content display control system including a plurality of display apparatuses capable of displaying a content distributed from a client terminal, and a server apparatus for providing authentication information to associate the client terminal with the plurality of display apparatuses, the content display control program including one or more sequences of instructions which, when executed by one or more processors:

to cause a computer of the server apparatus
to issue a set of authentication pattern information from among a plurality of sets of authentication pattern information stored in a storage of the server apparatus to a display apparatus among the plurality of display apparatuses on which an operation has been performed by a user, the set of authentication pattern information being associated with information relating to operations of the client terminal and being issued to the display apparatus in response to a request from the display apparatus for authentication pattern information; and
to disable issuing the set of authentication pattern information issued to the display apparatus to a further display apparatus in a period from issuing the authentication pattern information to receiving return of the set of authentication pattern information from the display apparatus; and to cause a computer of the display apparatus
to receive, from the server apparatus, operation pattern information and the set of authentication pattern information of the client terminal,
to display a content distributed from the client terminal that has output an operation pattern corresponding to the authentication pattern information, based on the received authentication pattern information, and
to return, to the server apparatus, the set of the authentication pattern information received.

10. The non-transitory computer-readable storage medium according to claim 9, wherein
the issuing includes issuing the authentication pattern information to the display apparatus on which an operation of specifying an area for displaying the content has been performed by the user.

11. The non-transitory computer-readable storage medium according to claim 9, wherein the content display control program stores additional instructions which, when executed by the one or more processors, cause:

the computer of the server apparatus
to receive, from the client terminal, operation pattern information indicating motion of the client terminal itself, and transfer, based on information on a tilt angle of the client terminal, the operation pattern information to a display apparatus having the same tilt angle as the tilt angle of the client terminal.

12. The non-transitory computer-readable storage medium according to claim 9, wherein
the authentication pattern information further includes guidance information for guiding an operation pattern.

13. The server apparatus as claimed in claim 4, wherein the display apparatus on which the operation has been performed by the user displays the guidance information for guiding the operation pattern upon receiving the set of authentication pattern information.

14. The content display control system according to claim 8, wherein the display apparatus on which the operation has been performed by the user displays the guidance information for guiding the operation pattern upon receiving the set of authentication pattern information.

15. The non-transitory computer-readable storage medium according to claim 12, wherein the content display control program stores additional instructions which, when executed by the one or more processors, cause:

the computer of the display apparatus on which the operation has been performed by the user to display the guidance information for guiding the operation pattern upon receiving the set of authentication pattern information.

* * * * *